United States Patent
Yoshida

(10) Patent No.: US 7,683,912 B2
(45) Date of Patent: Mar. 23, 2010

(54) IMAGE DISPLAY APPARATUS, IMAGE DISPLAY METHOD AND COMPUTER-READABLE RECORDING MEDIUM STORING IMAGE DISPLAY PROGRAM

(75) Inventor: Shohei Yoshida, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 632 days.

(21) Appl. No.: 11/455,808

(22) Filed: Jun. 20, 2006

(65) Prior Publication Data

US 2006/0232502 A1  Oct. 19, 2006

Related U.S. Application Data

(62) Division of application No. 10/449,494, filed on Jun. 2, 2003, now Pat. No. 7,088,372.

(30) Foreign Application Priority Data

Jun. 3, 2002  (JP) .............................. 2002-161738

(51) Int. Cl.
*G09G 5/02* (2006.01)

(52) U.S. Cl. ............... 345/589; 345/600; 345/604; 345/20; 345/63; 345/77; 382/167; 382/274

(58) Field of Classification Search .................. None
See application file for complete search history.

(56) References Cited

U.S. PATENT DOCUMENTS

| | | | |
|---|---|---|---|
| 5,247,366 A | 9/1993 | Ginosar et al. | |
| 5,428,720 A * | 6/1995 | Adams, Jr. | 345/604 |
| 5,717,422 A | 2/1998 | Fergason | |
| 5,793,446 A | 8/1998 | Nose et al. | |
| 5,959,696 A | 9/1999 | Hwang | |
| 6,242,857 B1 * | 6/2001 | Hashimoto et al. | 313/485 |
| 6,344,900 B1 | 2/2002 | Hidaka | |
| 6,795,063 B2 | 9/2004 | Endo et al. | |
| 6,816,141 B1 | 11/2004 | Fergason | |
| 2001/0007599 A1 * | 7/2001 | Iguchi et al. | 382/274 |
| 2002/0057238 A1 | 5/2002 | Nitta et al. | |
| 2002/0154693 A1 | 10/2002 | Demos et al. | |

FOREIGN PATENT DOCUMENTS

| | | |
|---|---|---|
| JP | A 3-64192 | 3/1991 |
| JP | H08-294137 | 11/1996 |
| JP | A 2000-224607 | 8/2000 |
| JP | A 2000-316172 | 11/2000 |
| JP | 2001-134226 | 5/2001 |
| JP | A 2001-125557 | 5/2001 |
| JP | 2001-238227 | 8/2001 |
| JP | A 2002-51353 | 2/2002 |
| JP | A 2002-132225 | 5/2002 |

* cited by examiner

*Primary Examiner*—Antonio A Caschera
(74) *Attorney, Agent, or Firm*—Oliff & Berridge, PLC

(57) ABSTRACT

An image display apparatus in which image signals of a plurality of primary colors are transformed by an image processing section into color space that includes lightness and chromaticity. When the chromaticity (color vividness) in this color space is being corrected, the correction method is changed in accordance with the optical modulation state of the display apparatus. If optical modulation is performed, then correction is made to lower the chromaticity, while correction is made to raise the chromaticity when there is no optical modulation.

8 Claims, 19 Drawing Sheets

MAIN EXPANSION COEFFICIENT: GRADIENT BETWEEN POINTS a-d
OFFSET: a

IMAGE DISPLAY APPARATUS, IMAGE DISPLAY METHOD AND COMPUTER-READABLE RECORDING MEDIUM STORING IMAGE DISPLAY PROGRAM

This is a Division of application Ser. No. 10/449,494 filed Jun. 2, 2003. The entire disclosure of the prior application is hereby incorporated by reference in its entirety.

BACKGROUND OF THE INVENTION

1. Field of the Invention

The present invention relates to an image display apparatus, an image display method, and a computer readable recording medium storing an image display program.

2. Description of Related Art

In recent years, the performance required by various fields in an image display apparatus has increased as informational technology has advanced. Among such image display apparatuses, a liquid crystal display that allows optical characteristics to be changed by the electrical control of the orientation of liquid crystal molecules, that has low power consumption, that is flat-panel shaped, and that does not strain the eyes and the like has become particularly sought after. Furthermore, a projection type of liquid crystal display (liquid crystal projector) in which images emitted from an optical system that uses liquid crystal light valves are transmitted through a projection lens and projected in enlargement on a screen is becoming widely used as one form of liquid crystal display.

In this projection type of liquid crystal display, liquid crystal light valves are used as an imager, however, due to leakage light and stray light, the brightness range (dynamic range) that can be displayed is narrow, and in some cases an improvement in image quality is difficult to achieve. Because of this, the dynamic range control method has been proposed for the improvement of the contrast of the image, which changes the flux of light irradiated into the light valves (imager) in accordance with image signals and expands data representing the brightness level of an image displayed on the light valve. However, if an image displayed on a light valve is expanded, problems occur such as the RGB ratio (balance) of a projected image deteriorating, and the color (i.e., the vividness of the color) of the projected image changing.

The present invention was conceived in view of the above circumstances, and it is an object thereof to provide an image display apparatus, an image display method, and a computer readable recording medium storing an image display program that enables the dynamic range of a displayed image (i.e., the range of displayable brightness) to be altered in accordance with image signals of a displayed image, which are the essence of an image being displayed, without changing the ratios of image signals of a plurality of primary colors.

SUMMARY OF THE INVENTION

The first aspect of the present invention is an image display apparatus that adjusts a displayed image by changing a flux of light and that has an expansion device that expands image signals of a plurality of primary colors of a displayed image based on a predetermined expansion coefficient, an image signal transformation device that transforms image signals expanded by the expansion device into color space that includes chromaticity and lightness, a correction device that corrects chromaticity in the color space; and a color space transformation device that transforms color space that includes a chromaticity corrected by the correction device into image signals of a plurality of primary colors.

Moreover, the first aspect of the present invention is an image display method that adjusts a displayed image by changing a flux of light, and that has a first step of expanding image signals of a plurality of primary colors of a displayed image based on a predetermined expansion coefficient; a second step of transforming image signals expanded in the first step into color space that includes chromaticity (saturation) and lightness (value), a third step of correcting chromaticity in the color space, and a fourth step of transforming color space that includes a chromaticity corrected in the third step into image signals of a plurality of primary colors.

The second aspect of the present invention is an image display apparatus that adjusts a displayed image by changing a flux of light, and that has an image signal transformation device that transforms image signals of a plurality of primary colors of a displayed image into color space that includes chromaticity and lightness, a correction device that corrects chromaticity in the color space, an expansion device that expands color value in color space that has been transformed by the image signal transformation device based on a predetermined expansion coefficient, and a color space transformation device that transforms color space that includes a color value expanded by the expansion device and the corrected chromaticity into image signals of a plurality of primary colors.

Moreover, the second aspect of the present invention is an image display method that adjusts a displayed image by changing a flux of light, and that has a first step of transforming image signals of a plurality of primary colors of a displayed image into color space that includes chromaticity and lightness, a second step of correcting chromaticity in the color space, a third step of expanding color value in color space that has been transformed in the first step based on a predetermined expansion coefficient; and a fourth step of transforming color space that includes a color value expanded in the third step and the corrected chromaticity into image signals of a plurality of primary colors.

In the present invention, a transformation into HSV space and a transformation into Yuv space can be held up as examples of transformations of image signals into color space by the image signal transformation device.

When the image signals are transformed into HSV space, the correction device corrects S signals, which are signals representing color vividness. When the image signals are transformed into Yuv space, the correction device corrects u signals and v signals, which are signals representing color.

Because the image display apparatus and image display method of the first aspect transform expanded image signals of a plurality of primary colors into color space that includes chromaticity and lightness, and, after correcting the chromaticity, then transforms the color space back into image signals of a plurality of primary colors, the dynamic range of a displayed image can be altered without changing the ratios of the image signals of the plurality of primary colors.

Because the image display apparatus and image display method of the second aspect transform image signals of a plurality of primary colors into color space that includes chromaticity and lightness, and, after expanding the color value and correcting the chromaticity, then transforms the color space back into image signals of a plurality of primary colors, the dynamic range of a displayed image can be altered without changing the ratios of the image signals of the plurality of primary colors.

Furthermore, in the first and second aspects, in the transformation into HSV space by the image signal transformation device, the correction calculation is a simple one, enabling the speed of the processing to be increased. In the transformation into Yuv space by the image signal transformation device, because the processing to make the transformation into Yuv space is performed on the basis of a predetermined formula, the speed of the transformation processing can be increased, enabling the processing speed of the overall correction processing to be increased.

The third aspect of the present invention is an image display apparatus that adjusts a displayed image by changing a flux of light, and that has an offset processing device that performs offset processing on image signals of a plurality of primary colors of a displayed image based on offset values, an expansion device that expands image signals that have undergone offset processing by the offset processing device based on a predetermined expansion coefficient, an image signal transformation device that transforms image signals expanded by the expansion device into color space that includes chromaticity and lightness, a correction device that corrects chromaticity in the color space; and a color space transformation device that transforms color space that includes a chromaticity corrected by the correction device into image signals of a plurality of primary colors.

Moreover, the third aspect of the present invention is an image display method that adjusts a displayed image by changing a flux of light, and that has a first step of performing offset processing on image signals of a plurality of primary colors of a displayed image based on offset values, a second step of expanding image signals that have undergone offset processing in the first step based on a predetermined expansion coefficient, a third step of transforming image signals expanded in the second step into color space that includes chromaticity and lightness, a fourth step of correcting chromaticity in the color space, and a fifth step of transforming color space that includes a chromaticity corrected in the fourth step into image signals of a plurality of primary colors.

The fourth aspect of the present invention is an image display apparatus that adjusts a displayed image by changing a flux of light, and that has an image signal transformation device that transforms image signals of a plurality of primary colors of a displayed image into color space that includes chromaticity and lightness, a correction device that corrects chromaticity in the color space, an offset processing device that performs offset processing on color value in color space that has been transformed by the image signal transformation device based on offset values, an expansion device that expands color value in color space that has undergone offset processing by the offset processing device based on a predetermined expansion coefficient, and a color space transformation device that transforms color space that includes color value that has been expanded by the expansion device and chromaticity that has been corrected by the correction device into image signals of a plurality of primary colors.

Moreover, the fourth aspect of the present invention is an image display method that adjusts a displayed image by changing a flux of light, and that has a first step of transforming image signals of a plurality of primary colors of a displayed image into color space that includes chromaticity and lightness, a second step of correcting chromaticity in the color space, a third step of performing offset processing on color value in color space that has been transformed in the first step based on offset values; a fourth step of expanding color value in color space that has undergone offset processing in the third step based on a predetermined expansion coefficient, and a fifth step of transforming color space that includes color value that has been expanded in the fourth step and chromaticity that has been corrected in the second step into image signals of a plurality of primary colors.

The image display apparatus and image display methods of the third and fourth aspects ensure that there is no change to the color vividness of image signals by the offset processing device performing offset processing based on an offset value.

Here, the value of substantially the darkest portion from the image data is used for the offset value. The term "offset processing" refers to the subtraction or addition of an offset value to an image signal so as to ensure there is no change to the color vividness of that image signal.

In the image display apparatus and image display methods of the third and fourth aspects, because offset processing is performed on image signals before they are transformed into color space, or on color value in color space after image signals have been transformed into color space, vivid portions of the image signals stand out. Therefore, the effect when chromaticity is corrected can be manifested even more clearly.

The fifth aspect of the present invention is an image display apparatus that adjusts a displayed image by changing a flux of light, and that has a correction device that corrects chromaticity in image signals based on a predetermined calculation formula for each image signal of a plurality of primary colors of a displayed image.

Moreover, the fifth aspect of the present invention is an image display method that adjusts a displayed image by changing a flux of light, and that has the step of correcting expansion and chromaticity on image signals based on a predetermined calculation formula for respective image signals of a plurality of primary colors of a displayed image.

Because the image display apparatus and image display method of the fifth aspect perform chromaticity correction directly by calculation using a predetermined calculation formula, the labor required to transform image signals to color space and then transform the color space back to image signals can be shortened, and an increase in the speed of the correction processing can be achieved.

The sixth aspect of the present invention is an image display apparatus that adjusts a displayed image by changing a flux of light, and that has a transformation device that expands respective image signals of a plurality of primary colors of a displayed image based on a predetermined transformation table, and a correction device that corrects chromaticity of image signals of each color that have been transformed by the transformation device.

Moreover, the sixth aspect of the present invention is an image display method that adjusts a displayed image by changing a flux of light, and that has a first step of performing expansion or offset processing on respective image signals of a plurality of primary colors of a displayed image based on a predetermined transformation table, and a second step of correcting chromaticity in image signals of each color that have been transformed in the first step.

In the image display apparatus and image display method of the sixth aspect, by using a transformation table complicated expansion processing is made possible and the image representation width can be broadened.

It is also possible for the image display apparatus of the present invention to further have a detection device that detects a flux of leakage light, and for the correction device to make corrections based on the flux of leakage light.

The term "flux of leakage light" refers to the flux of light that is displayed when the light valve is set such that the display is at its darkest setting.

By employing this structure, because the correction device is able to take the flux of leakage light also into consideration when making a correction, it is able to correct chromaticity more correctly.

Moreover, it is also possible to employ a structure in which the expansion device makes an expansion based on a predetermined expansion coefficient, and further has a prediction device that predicts the chromaticity based on at least one of the offset value and the expansion coefficient and on the flux of leakage light, and in which the correction device makes a correction based on a chromaticity predicted by the prediction device.

By employing this structure accurate chromaticity correction can be made because the correction device makes a correction based on a chromaticity predicted by the prediction device.

Moreover, it is also possible to employ a structure further having a selection device that selects one of a plurality of chromaticities predicted by the prediction device, and the correction device makes a correction based on a chromaticity selected by the selection device.

By employing this structure correction can be made in accordance with a user's specifications because the method of correction by the correction device can be selected by the selection device.

Examples of the plurality of chromaticities predicted by the prediction device include chromaticity predicted on the basis of expanded image signals and chromaticity predicted on the basis of unexpanded image signals.

The correction by the correction device may be a correction to raise the color vividness or a correction to lower the color vividness. The term "correction to raise the color vividness" refers to a correction to match the color vividness to a chromaticity predicted on the basis of expanded image signals. The term "correction to lower the color vividness" refers to a correction to match the color vividness to a chromaticity predicted on the basis of unexpanded image signals.

The seventh aspect of the present invention is a computer-readable recording medium storing an image display program for adjusting a displayed image by changing a flux of light, the program being executable on a computer, and having an expansion function that expands image signals of a plurality of primary colors of a displayed image based on a predetermined expansion coefficient, an image signal transformation function that transforms image signals expanded by the expansion function into color space that includes chromaticity and lightness, a correction function that corrects chromaticity in the color space; and a color space transformation function that transforms color space that includes a chromaticity corrected by the correction function into image signals of a plurality of primary colors.

The eighth aspect of the present invention is a computer-readable recording medium storing an image display program for adjusting a displayed image by changing a flux of light, the program being executable on a computer, and having an image signal transformation function that transforms image signals of a plurality of primary colors of a displayed image into color space that includes chromaticity and lightness, a correction function that corrects chromaticity in the color space, an expansion function that expands color value in color space that has been transformed by the image signal transformation function based on a predetermined expansion coefficient, and a color space transformation function that transforms color space that includes a color value expanded by the expansion function and the corrected chromaticity into image signals of a plurality of primary colors.

The ninth aspect of the present invention is a computer-readable recording medium storing an image display program for adjusting a displayed image by changing a flux of light, the program being executable on a computer, and having an offset processing function that performs offset processing on image signals of a plurality of primary colors of a displayed image based on offset values, an expansion function that expands image signals that have undergone offset processing in the offset processing function based on a predetermined coefficient, an image signal transformation function that transforms image signals expanded by the expansion function into color space that includes chromaticity and lightness, a correction function that corrects chromaticity in the color space, and a color space transformation function that transforms color space that includes a chromaticity corrected by the correction function into image signals of a plurality of primary colors.

DETAILED DESCRIPTION OF EMBODIMENTS

Preferred embodiments of the image display apparatus, image display method, and computer readable recording medium storing an image display program of the present invention will now be described in detail while referring to FIGS. 1 through 20.

In this description, a projection monitor with three light valves that is provided with a liquid crystal light valve for each different RGB color is used as an example of an image display apparatus that uses the image display method of the present invention.

Figure 1:
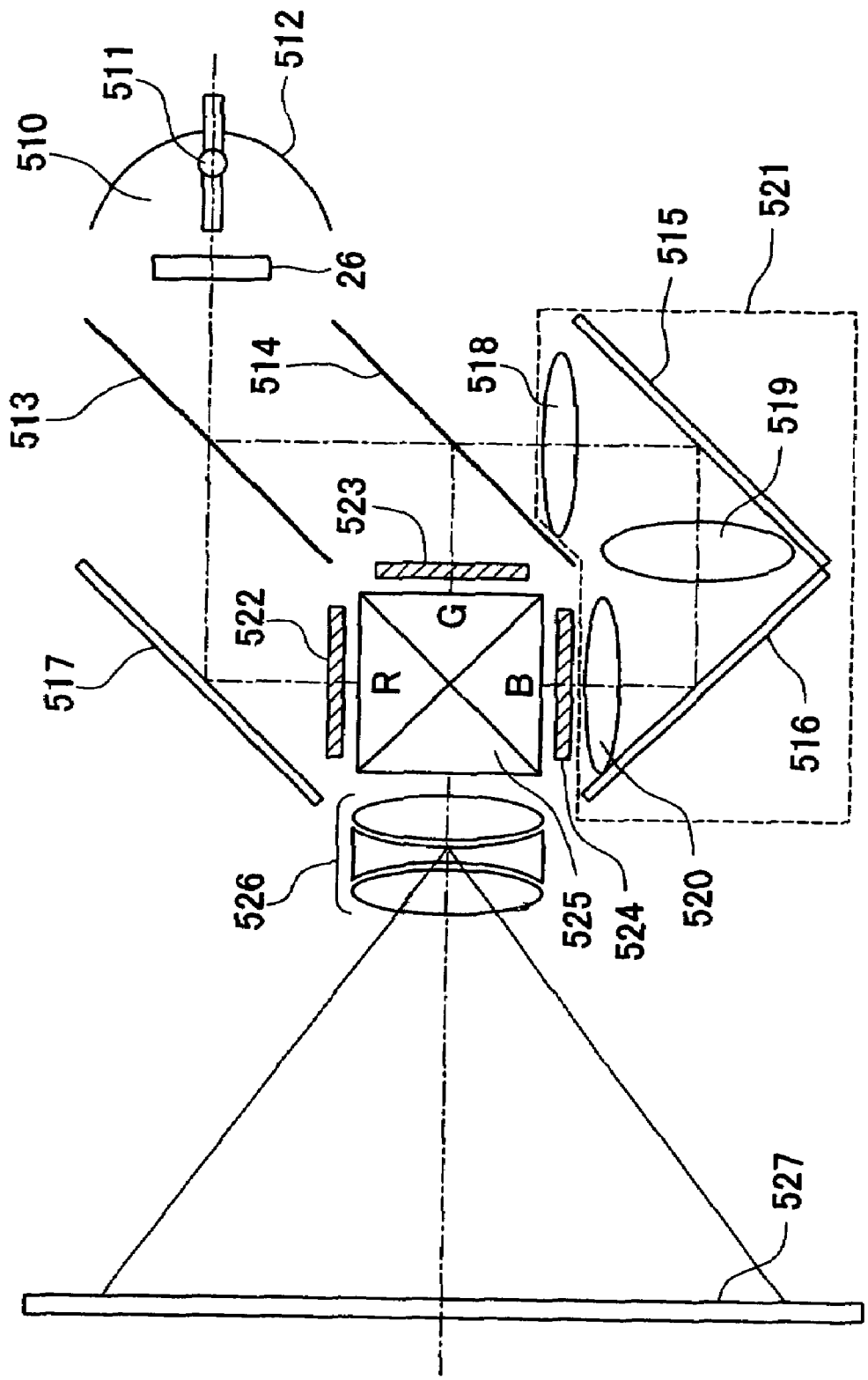
FIG. 1 is a schematic structural view showing an example of a projection type display apparatus.

FIG. 1 is a schematic structural view showing an example of a projection type display apparatus.

As is shown in FIG. 1, the projection type display apparatus is provided with a light source 510, an optical modulator 26, dichroic mirrors 513 and 514, reflection mirrors 515, 516, and 517, relay lenses 518, 519, and 520, a liquid crystal light valve for red light 522, a liquid crystal light valve for green light 523, a liquid crystal light valve for blue light 524, a cross dichroic prism 525, and a projection lens system 526.

The optical modulator 26 may be formed, for example, by a liquid crystal panel with variable transmissivity.

The light source 510 is formed by a lamp 511, such as an ultra-high pressure mercury vapor lamp, and a reflector 512 that reflects light from the lamp 511. The optical modulator 26 that adjusts the flux of light from the light source 510 is positioned between the light source 510 and the dichroic mirror 513.

The blue and green light reflection dichroic mirror 513 allows red light from white light from the light source 510 to be transmitted, and reflects blue light and green light. The transmitted red light is reflected by the reflection mirror 517 and is irradiated into the liquid crystal light valve for red light 522.

The green light that is reflected by the dichroic mirror 513 is reflected by the dichroic mirror 514 for reflecting green light, and is irradiated into the liquid crystal light valve for green light 523.

The blue light that is reflected by the dichroic mirror 513 is transmitted through the dichroic mirror 514, and is irradiated into the liquid crystal light valve for blue light 524 via a relay system 521 formed by the relay lens 518, the reflection mirror 515, the relay lens 519, the reflection mirror 516, and the relay lens 520.

The light of the three colors modulated by the respective liquid crystal light valves 522, 523, and 524 is irradiated into the cross dichroic prism 525. This prism is formed by bonding together four rectangular prisms. On the inner surfaces thereof a dielectric multilayer film that reflects red light and a dielectric multilayer film that reflects blue light are provided in a cruciform pattern. The light of the three colors is then synthesized by these dielectric multilayer films to form light representing a color image. The synthesized light is projected onto a screen 527 by the projection lens system 526, which is a projection optical lens system, so that an enlarged image is displayed.

Image processing sections (not shown in FIG. 1) that perform predetermined image processing on the light of each color based on image signals are connected to each of the liquid crystal light valves 522, 523, and 524. Image signals that have undergone predetermined image processing in the image processing sections are supplied to the respective liquid crystal light valves 522, 523, and 524 via light valve drivers. The projection type display apparatus of the present invention displays an image on the basis of predetermined image processing performed in the image processing sections.

Here, the image display method of the first through fourth embodiments according to the projection type display apparatus of the present embodiment will be described.

Figure 2:
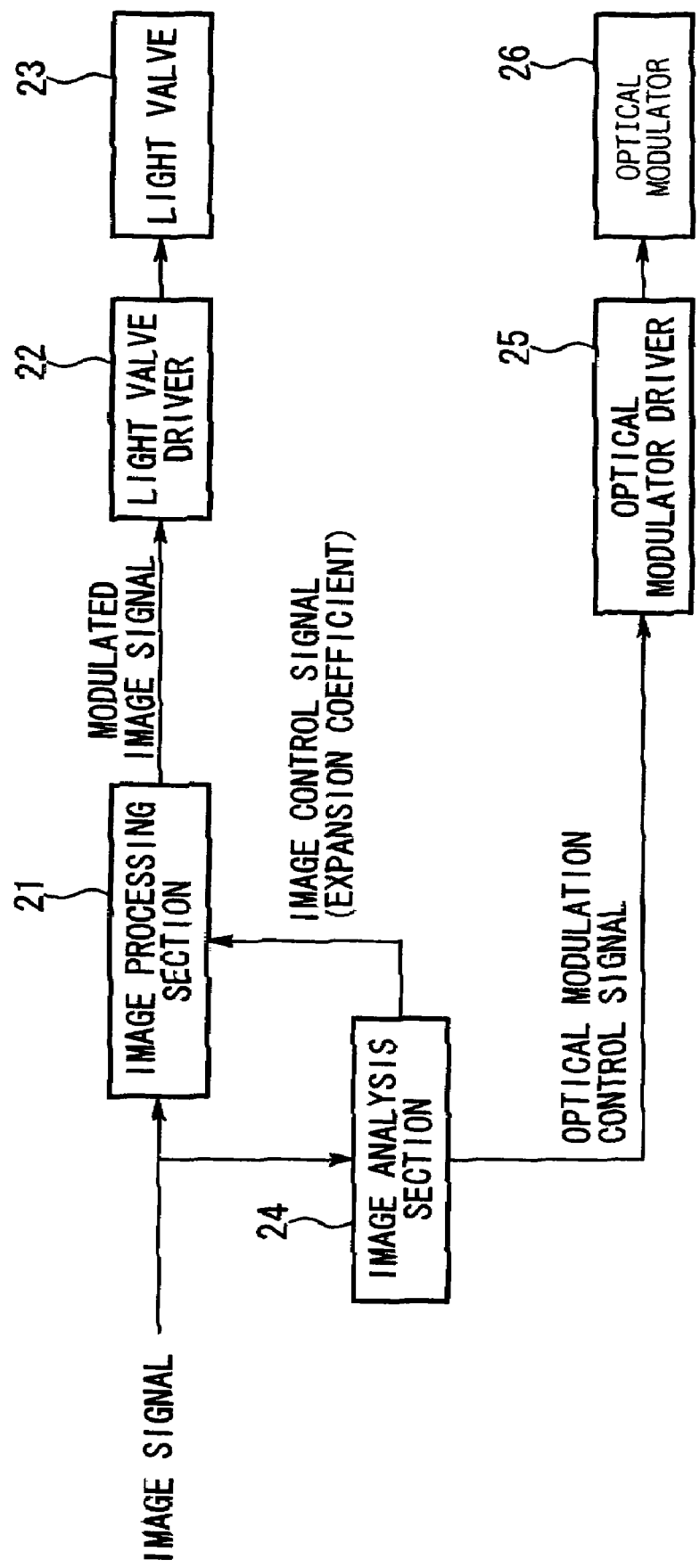
FIG. 2 is a block diagram showing the structure of a drive circuit of the projection type display apparatus of the first embodiment.

FIG. 2 is a block diagram showing the structure of a drive circuit of the projection type display apparatus of the first embodiment.

Firstly, image signals are input into an image processing section 21 and an image analysis section 24. In the image analysis section 24, the image signals are analyzed and an expansion coefficient is calculated. This is then supplied to the image processing section 21 as an image control signal.

The image analysis section 24 also controls an optical modulator driver 25 based on optical modulation control signals. The optical modulator driver 25 controls the optical modulator 26. The optical modulator driver 25 changes the quantity of illumination light from the light source 510 in accordance with whether or not there is an image signal expansion supplied to the respective light valves 522, 523, and 524 by the image processing section 21. As a result, it is possible to achieve smooth gradation expression while enlarging the brightness range of a displayed image. In the projection type display apparatus of the present invention, as a result of the above described operation, it is possible to broaden the dynamic range and achieve an improvement in image quality.

When, for example, the image signals supplied to each of the liquid crystal light valves 522, 523, and 524 are expanded, the optical modulator driver 25 controls the optical modulator 26 such that the quantity of illumination light is decreased.

On the other hand, when RGB signals are input into the image processing section 21, the RGB signals are transformed into either HSV space or Yuv space, which are color spaces. After performing predetermined image processing on the image signals that have been transformed into color spaces (HSV spaces or Yuv spaces), the image processing section 21 performs a back transformation on the color spaces so as to restore them to RGB signals. The RGB signals that have been transformed back by the image processing section 21 are input into a light valve driver 22 for each color light. The light valve driver 22 controls a light valve 23 for each color light based on the back transformed RGB signals.

Next, a detailed description will be given while referring to FIG. 3 of the image processing by the image processing section 21 of the first embodiment.

Figure 3:
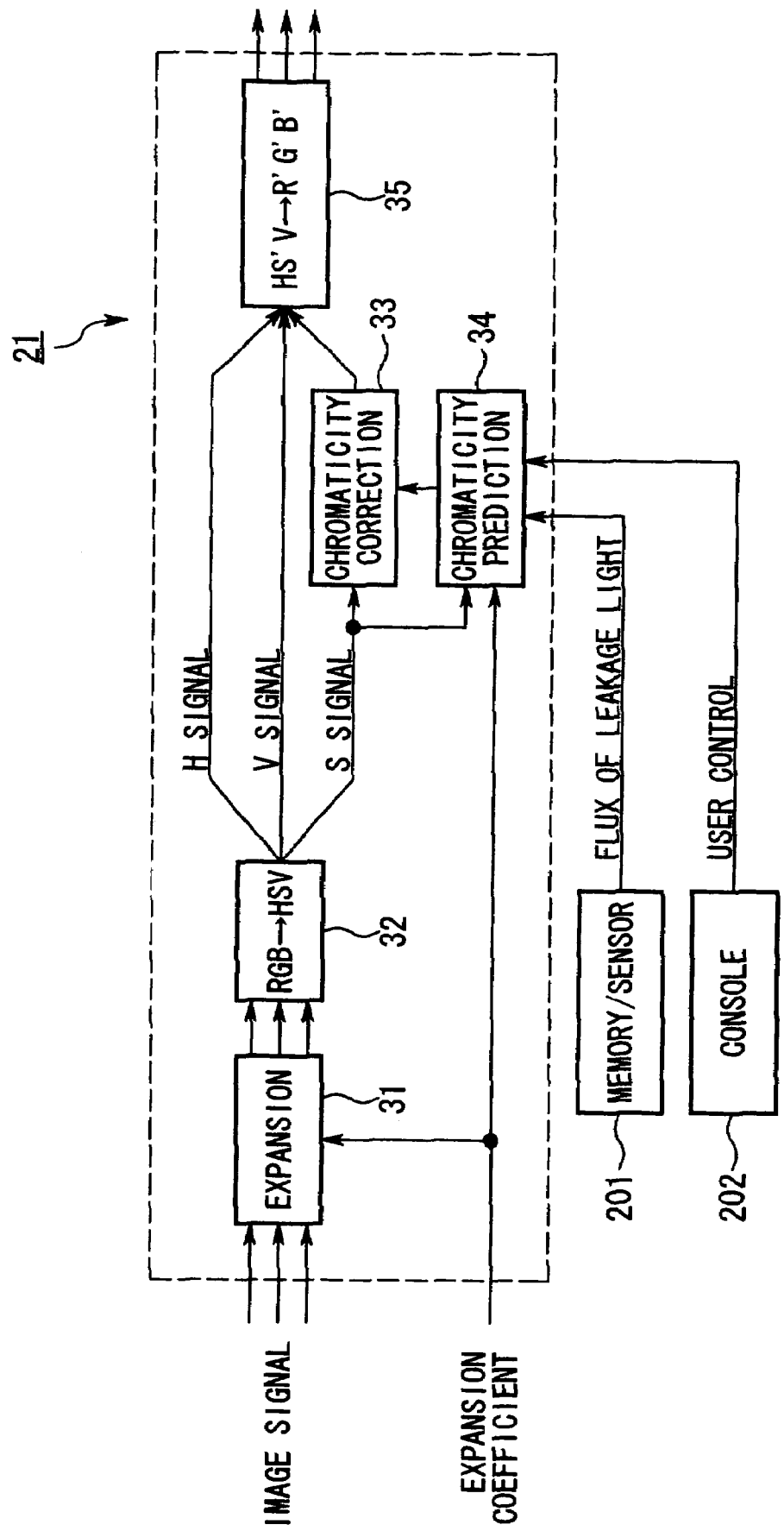
FIG. 3 is a block diagram showing the structure of an image processing section when image signals are transformed into HSV space.
Figure 4:
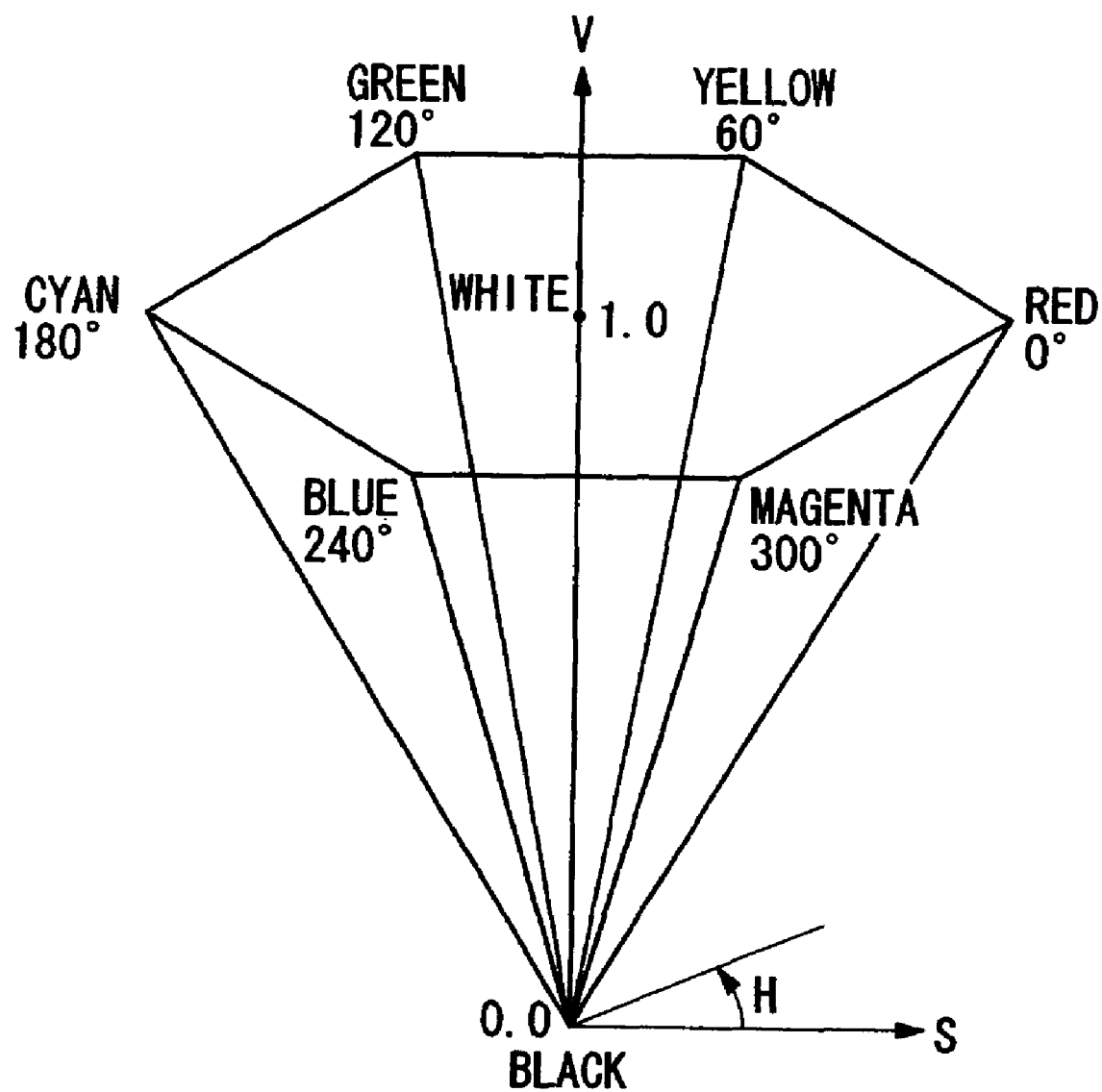
FIG. 4 is a view showing an HSV color space.

FIG. 3 is a block diagram showing the structure of the image processing section 21 when image signals are transformed into HSV space.

As is shown in FIG. 3, the image processing section 21 is provided with an expansion section 31, an image signal transformation section 32, a chromaticity correction section 33, a chromaticity prediction section 34, and a color space transformation section 35.

The expansion section (i.e. the expansion device) 31 performs expansion processing on image signals in accordance with an expansion coefficient supplied from the image analysis section 24.

The image signal transformation section (i.e., the image signal transformation device) 32 transforms RGB signals that have undergone expansion processing into HSV space, which is a color space. This HSV space is a color space such as that shown in FIG. 4, with the H signals expressing hue, the S signals expressing chromaticity (color vividness), and the V signals expressing lightness (color value).

A memory/sensor section (detecting device) 201 is positioned on the emission side of the light valve 23. The memory/sensor section 201 detects the flux of leakage light from the light valve 23 and records the detected flux of leakage light. The term "flux of leakage light" refers to the brightness on the screen when the image signal is 0. More specifically, it refers to the flux of light that leaks onto the screen even when the respective liquid crystal valves 522, 523, and 524 are all in a dark display state, and in spite of the fact that the flux of light from the light source 510 has been shut out by an optical modulator.

This flux of leakage light may be measured during the pre-shipping inspection and stored as a default value. It is also possible for the flux of leakage light to be measured when the power of the projection type display apparatus is turned on or during start up of the projection type display apparatus, and for this measurement to be stored.

A console section (selection device) 202 is where a user selects correction parameters such as whether to raise or lower the chromaticity correction to the chromaticity predicted by the chromaticity prediction section 34.

The chromaticity prediction section (prediction device) 34 predicts the chromaticity of a projected image signal based on expansion coefficients supplied from the image analysis section 24 and fluxes of leakage light supplied from the memory/sensor section 201.

The chromaticity correction section (correction device) 33 performs chromaticity correction on color vividness signals (S signals) among the HSV space based on chromaticity prediction values predicted by the chromaticity prediction section 34.

The color space transformation section (color space transformation device) 35 performs back transformation to restore HSV space to RGB signals.

A description will now be given of the correction processing of the image processing section 21 when a transformation has been made into HSV space using specific numerical values. Here, as an example, a description is given of chromaticity correction when the image signals (R, G, B) are (10, 50, 20), the flux of leakage light is 10, and the expansion coefficient is 2. It is assumed that gamma valve is 1.0.

Firstly, when normal image signals are transformed into HSV space, they are as is shown in Formula (1) below. Here, the chromaticity prediction section 34 transforms image signals, to which the flux of leakage light of 10 has been added, into HSV space, and predicts the chromaticity. As is shown in Formula (2), here, the chromaticity is predicted to be 170.

(1) Original signal
(R, G, B)=(10, 50, 20). At this time (H, S, V)=(135, 204, 50)

(2) After taking flux of leakage light into consideration
(R, G, B)=(20, 60, 30). At this time (H, S, V)=(135, 170, 60)

Next, the chromaticity prediction section 34 predicts chromaticity for an image signal when the expansion coefficient is an expansion factor of 2. The image signal before the expansion can be expressed as is shown in Formula (3) to provide the same formula as Formula (1) above.

(3) Original signal
(R, G, B)=(10, 50, 20). At this time (H, S, V)=(135, 204, 50)

Next, if the image signal is expanded by a factor of 2, the chromaticity prediction after the twofold expansion is shown below in Formula (4).

(4) Expansion
(R, G, B)=(20, 100, 40). At this time (H, S, V)=(135, 204, 100)

If the image signals resulting when the flux of leakage light of 10 is added to the image signals that have undergone the twofold expansion of Formula (4) are transformed into HSV space, and the chromaticity is predicted, then they are as shown in Formula (5).

(5) After taking flux of leakage light into consideration
(R, G, B)=(30, 110, 50). At this time (H, S, V)=(135, 185, 110)

Next, because there was an expansion factor of 2, if the image signals of Formula (5) are modulated by ½ as their optical modulation (light reduction, dimming) factor, then they are as shown in Formula (6).

(6) Optical modulation (×½)
(R, G, B)=(15, 55, 25). At this time (H, S, V)=(135, 185, 55)

Here, as is shown in Formula (6), the chromaticity when expansion factor is 2 is predicted to be 185. The chromaticity correction section 33 performs chromaticity correction based on the values of the chromaticity (here, 170 and 185) predicted by the chromaticity prediction section 34.

A description will now be given of the chromaticity correction performed by the chromaticity correction section 33. Chromaticity correction is a method of either lowering color space chromaticity to the chromaticity predicted for when there is no expansion, or raising the color space chromaticity to the chromaticity predicted for when there is an expansion.

Firstly, a description will be given of when correction is performed by making an adjustment to lower the chromaticity to 170.

In the above Formula (4), if S' is 185, then the image signals are as shown below.

(H, S', V)=(135, 185, 100). At this time (R, G, B)=(27, 100, 45).

If this (R, G, B)=(27, 100, 45) is given a flux of leakage light of 10 and an optical modulation factor of ½, then (5') After taking flux of leakage light into consideration
(R, G, B)=(37, 110, 55). At this time (H, S, V)=(135, 170, 110)

(6') Optical modulation (×½)
(R, G, B)=(18, 55, 28). At this time (H, S, V)=(135, 170, 55)

As is shown in Formula (6'), adjustment has been made to lower the chromaticity to 170.

Next, a description will be given of when correction is performed by making an adjustment to raise the chromaticity to 185.

In the above Formula (1), if S'=204×185/170=223, then the image signals are as shown below in Formula (1').

(1') Original signal
(H, S', V)=(135, 223, 50). At this time (R, G, B)=(6, 50, 17)

If this (R, G, B)=(6, 50, 17) is given a flux of leakage light of 10 and an optical modulation factor of ½, then (2') After taking flux of leakage light into consideration
(R, G, B)=(16, 60, 27). At this time (H, S, V)=(135, 185, 60)

As is shown in Formula (2'), adjustment has been made to raise the chromaticity to 185.

When transforming image signals into HSV space and correcting chromaticity in this manner, the calculation for the chromaticity correction is simple and an increase in processing speed can be achieved.

Figure 5:
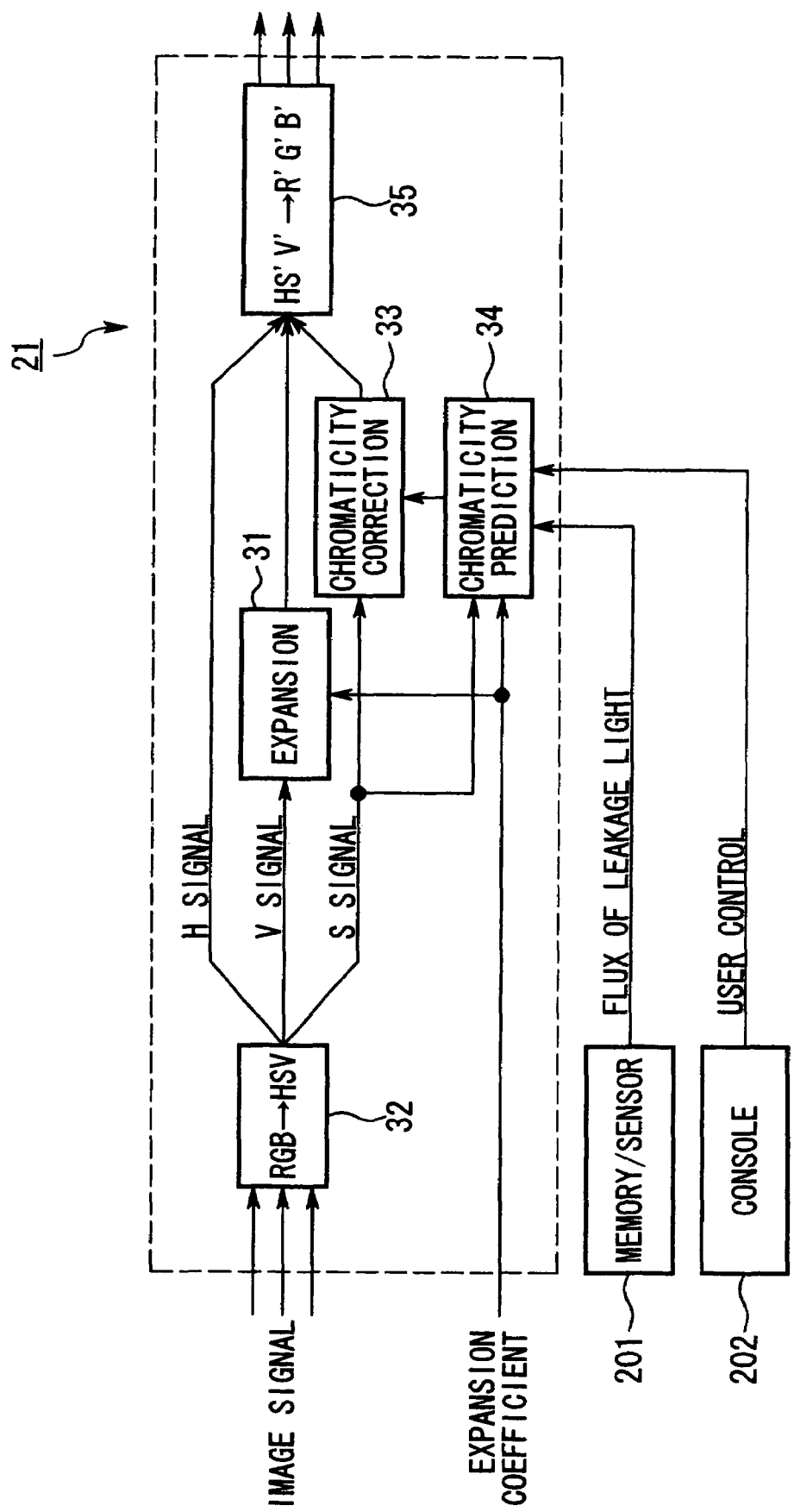
FIG. 5 is a block diagram showing a variant example of the image processing section shown in FIG. 3.

FIG. 5 is a block diagram showing a variant example of the image processing section 21 of FIG. 3. Note that the same numbers are given to component elements that are identical to those appearing in FIG. 3, and a description thereof is omitted.

In the image processing section 21 shown in FIG. 5, a structure is employed in which the expansion processing by the expansion section 31 is only performed on V signals after transformation thereof by the image signal transformation section 32.

Figure 6:
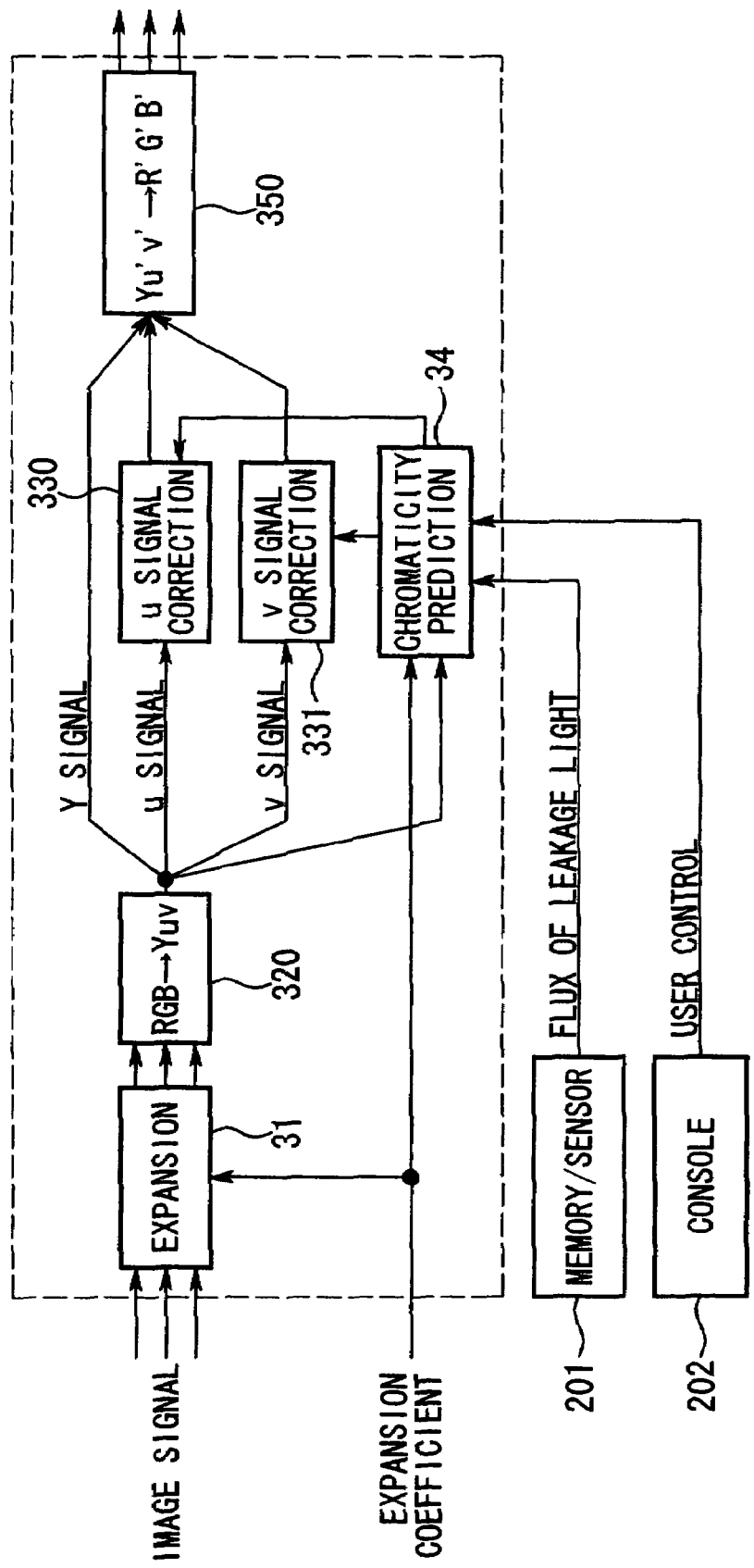
FIG. 6 is a block diagram showing the structure of an image processing section when image signals are transformed into Yuv space.

Because expansion processing is performed on V signals, which indicate brightness value information after transformation into color space, it is possible to reduce the size of the circuit structure, and further increase the processing speed. FIG. 6 is a block diagram showing the structure of the image processing section 21 when image signals are transformed into Yuv space. Note that the same numbers are given to component elements that are identical to those appearing in FIG. 3, and a description thereof is omitted.

As is shown in FIG. 6, the image processing section 21 is provided with an expansion section 31, an image signal transformation section 320, a u signal correction section 330, a v signal correction section 331, a chromaticity prediction section 34, and a color space transformation section 350.

The image signal transformation section 320 transforms RGB signals that have been expanded into Yuv space, which is a color space. This transformation into Yuv space is performed on the basis of transformation formulas such as those shown in Formula Group A below. In Yuv space the Y signals express brightness and the u signals and v signals express chromaticity, and from these it is possible to express chromaticity (color vividness).

$$\begin{pmatrix} Y \\ u \\ v \end{pmatrix} = \begin{pmatrix} 0.299 & 0.587 & 0.114 \\ -0.147 & -0.289 & 0.436 \\ 0.615 & -0.515 & -0.100 \end{pmatrix} \begin{pmatrix} r \\ g \\ b \end{pmatrix} \quad \text{[Formula group A]}$$

$$\begin{pmatrix} r \\ g \\ b \end{pmatrix} = \begin{pmatrix} 1 & 0 & 1.14 \\ 1 & -0.394 & -0.581 \\ 1 & 2.03 & 0 \end{pmatrix} \begin{pmatrix} Y \\ u \\ v \end{pmatrix}$$

$$H = \tan^{-1}(v/u)$$

$$S = \sqrt{u^2 + v^2}/Y$$

The chromaticity prediction section 34 predicts the chromaticity of projected image signals based on expansion coefficients supplied from the image analysis section 24 and quantities of escaped light that are supplied from the memory/sensor section 201.

The u signal correction section 330 performs chromaticity correction of u signals, which are color vividness signals, based on chromaticity prediction values predicted by the chromaticity prediction section 34. In the same way, the v signal correction section 331 performs chromaticity correction of v signals, which are color vividness signals, based on chromaticity prediction values predicted by the chromaticity prediction section 34.

The color space transformation section 350 performs back transformation to restore Yuv space to RGB signals.

A description will now be given of the correction processing of the image processing section 21 when a transformation has been made into Yuv space using specific numerical values. Here, as an example, a description is given of u signal correction and v signal correction when the image signals (R, G, B) are (10, 50, 20), the flux of leakage light is 10. It is assumed that gamma valve is 1.0.

Firstly, when normal image signals are transformed into Yuv space based on Formula group A, a formula such as Formula (7) below is obtained. Here, if image signals, to which the flux of leakage light of 10 has been added, are also transformed into Yuv space based on Formula group A, they are as shown in Formula (8) below.

(7) Original signals (R, G, B)=(10, 50, 20). At this time (Y, u, v)=(35, −7.2, −22)

(8) After taking flux of leakage light into consideration (R, G, B)=(20, 60, 30). At this time (Y, u, v)=(45, −7.2, −22)

For Yuv space, as is shown by Formula group A, the chromaticity is expressed by $(u^2 \times v^2)^{1/2}/Y$. As a result, the chromaticity prediction section 34 predicts that the chromaticity $S_{(2)}$ with the flux of leakage light taken into consideration will equal 0.510.

Next, the chromaticity prediction section 34 predicts chromaticity for an image signal when the expansion coefficient is an expansion factor of 2. The image signal before the expansion can be expressed as is shown in Formula (9) to provide the same formula as Formula (7) above.

(9) Original signal (R, G, B)=(10, 50, 20). At this time (Y, u, v)=(35, −7.2, −22)

Next, if the image signal is expanded by a factor of 2, the chromaticity prediction after the twofold expansion is shown below in Formula (10).

(10) Twofold expansion (R, G, B)=(20, 100, 40). At this time (Y, u, v)=(69, −14, −43)

If the image signals resulting when the flux of leakage light of 10 is added to the image signals that have undergone the twofold expansion of Formula (10) are transformed into Yuv space, then they are as shown in Formula (11).

(11) After taking flux of leakage light into consideration (R, G, B)=(30, 110, 50). At this time (Y, u, v)=(79, −14, −4)

(12) Optical modulation (×½)

(R, G, B)=(15, 55, 25). At this time (Y, u, v)=(40, −7.2, −22)

Next, because there was an expansion factor of 2, if the image signals of Formula (11) are modulated by ½ as their optical modulation (light reduction, dimming) factor, then they are as shown in Formula (12).

As described above, because chromaticity can be expressed by $(u^2+v^2)^{1/2}/Y$ in the case of Yuv space, the chromaticity prediction section 34 predicts the chromaticity when expansion factor is 2 will be $S_{(12)}=0.575$.

A description will now be given of the chromaticity correction performed by the u signal correction section 330 and the v signal correction section 331. Chromaticity correction is a method of either lowering color space chromaticity to the chromaticity predicted for when there is no expansion, or raising the color space chromaticity to the chromaticity predicted for when there is an expansion.

Firstly, a description will be given of when correction is performed by making an adjustment to lower the chromaticity to $S_{(2)}=0.510$.

In the above Formula (10), if u'=−14×40/45=−13 and v'=−43×40/45=−38, then the image signals are as shown below.

(Y, u', v')=(69, −13, −38). At this time (R, G, B)=(26, 97, 43).

If this (R, G, B)=(26, 97, 43) is given a flux of leakage light of 10 and an optical modulation factor of ½, then (11') After taking flux of leakage light into consideration (R, G, B)=(36, 107, 53). At this time (Y, u, v)=(79, −13, −38)

(12') Optical modulation (×½)

(R, G, B)=(18, 54, 45). At this time (Y, u, v)=(40, −6.4, −19).

With u=−6.4 and v=−19, then if the chromaticity is determined using $(u^2+v^2)^{1/2}/Y$, then $S_{(12')}=0.510$. As a result, adjustment has been made to lower the chromaticity to 0.510.

Next, a description will be given of when correction is performed by making an adjustment to raise the chromaticity to $S_{(12)}=0.575$.

In the above Formula (7), if $u_1=-7\times45/40$ and $v_1=-22\times45/40$, then the image signals are as shown below.

(Y, $u_1$, $v_1$)=(35, −8.1, −24). At this time (R, G, B)=(7, 52, 18).

If this (R, G, B)=(7, 52, 18) is given a flux of leakage light of 10 and an optical modulation factor of ½, then (8') After taking flux of leakage light into consideration (R, G, B)=(17, 62, 28). At this time (Y, u, v)=(45, −8.1, −24).

With u=−8.1 and v=−24, then if the chromaticity is determined using $(u^2+v^2)^{1/2}/Y$, then $S_{(8')}=0.575$. As a result, adjustment has been made to raise the chromaticity to 0.575.

When transforming image signals into Yuv space and correcting chromaticity in this manner, because the transformation into Yuv space is made based on a predetermined formula (matrix), the transformation is simple and an increase in processing speed can be achieved.

Figure 7:
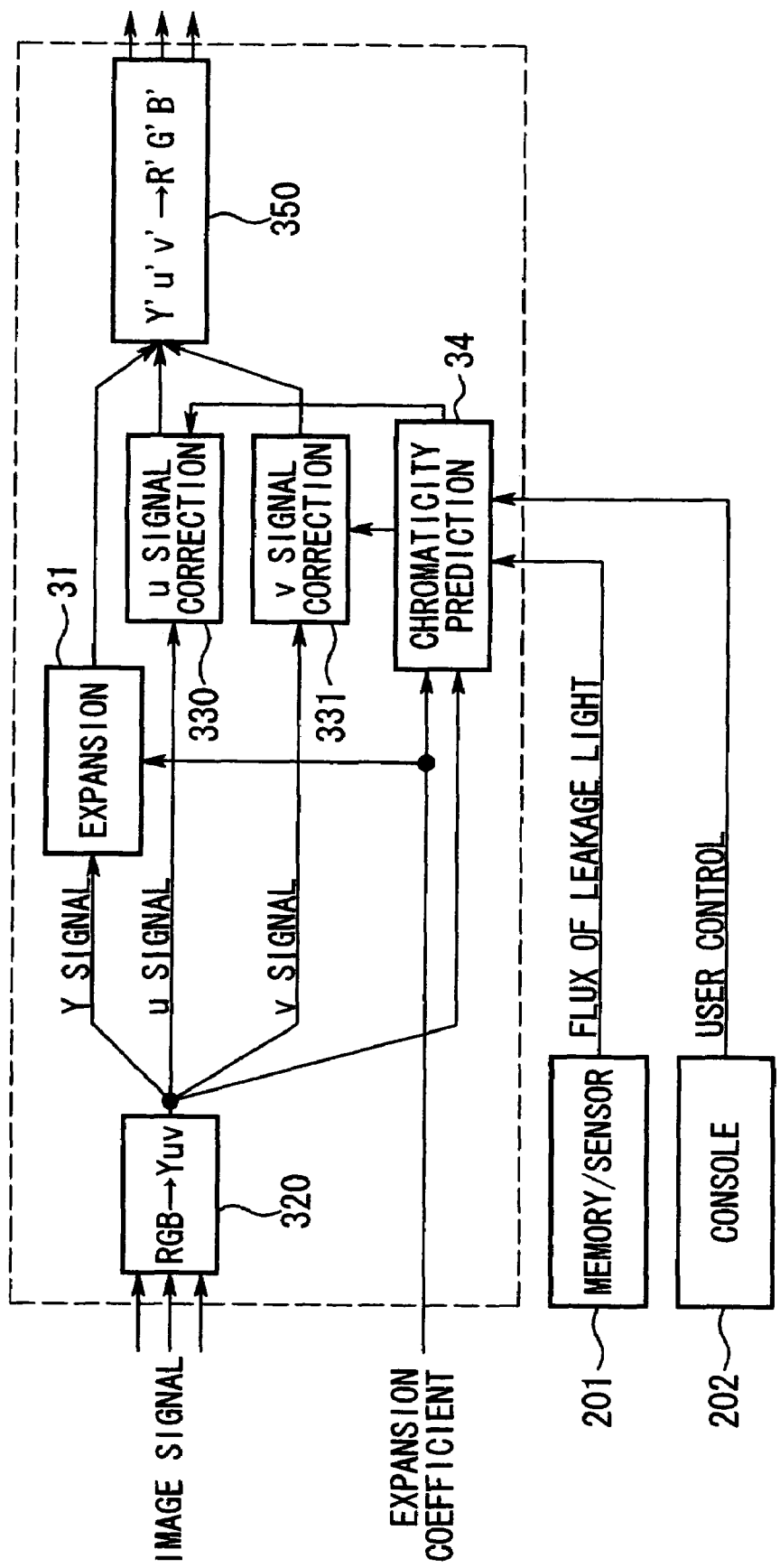
FIG. 7 is a block diagram showing a variant example of the image processing section shown in FIG. 6.

FIG. 7 is a block diagram showing a variant example of the image processing section 21 of FIG. 6. Note that the same numbers are given to component elements that are identical to those appearing in FIG. 6, and a description thereof is omitted.

In the image processing section 21 shown in FIG. 7, a structure is employed in which the expansion processing by the expansion section 31 is only performed on Y signals of the Yuv space after transformation thereof by the image signal transformation section 32. Because expansion processing is performed only on Y signals, which indicate brightness value information, it is possible to reduce the size of the circuit structure, and further increase the processing speed.

The second embodiment will now be described. Note that the same numbers are given to component elements that are identical to those of the first embodiment, and a description thereof is omitted.

Figure 8:
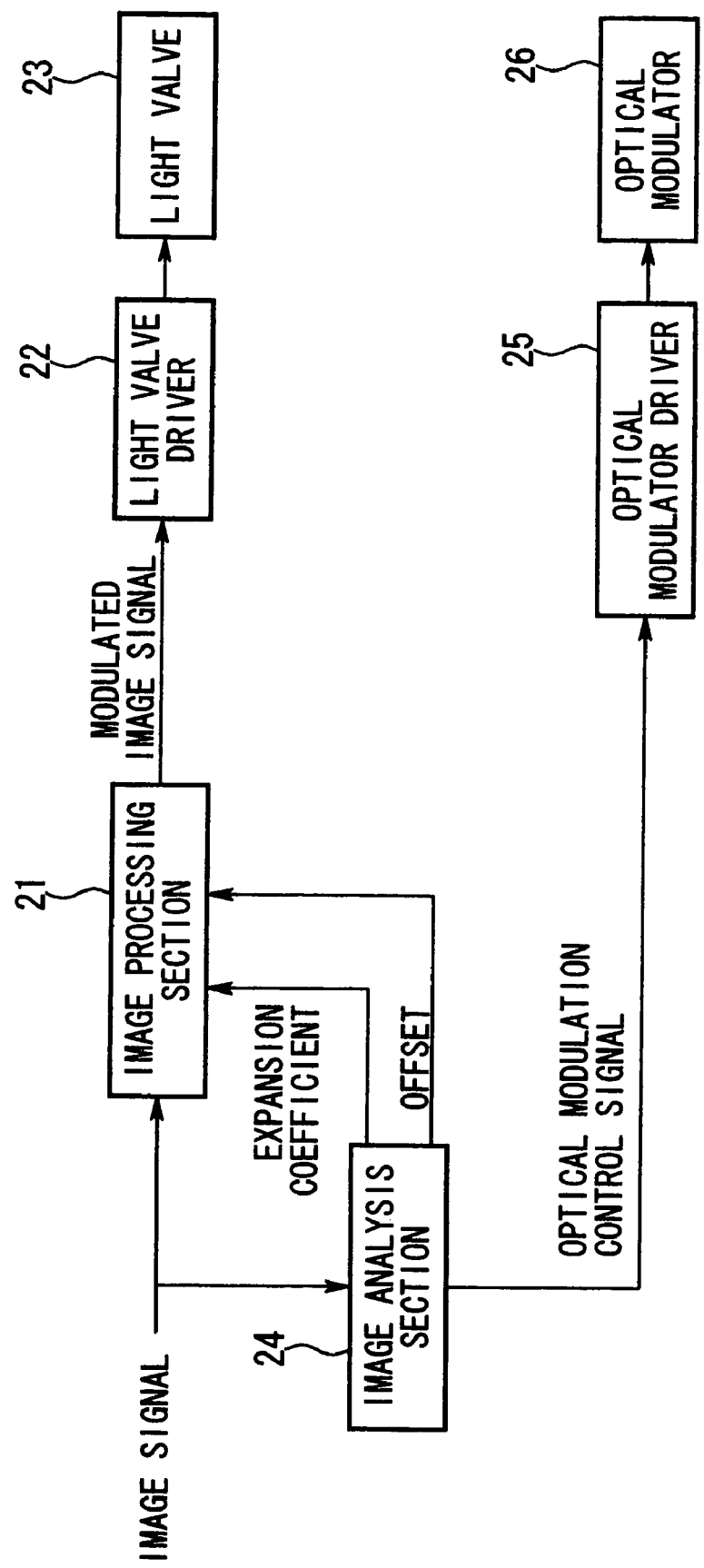
FIG. 8 is a block diagram showing the structure of a drive circuit of the projection type display apparatus of the second embodiment.

FIG. 8 is a block diagram showing the structure of a drive circuit of the projection type display apparatus of the second embodiment.

In the drive circuit of the second embodiment, expansion coefficients and offset values (offset quantity) are supplied from the image analysis section 24 to the image processing section 21. The term "offset values" refers to the darkest value among the image data. By subtracting the offset value from the image signal when performing offset processing, unnecessary black floating can be suppressed in an image signal.

Figure 9:
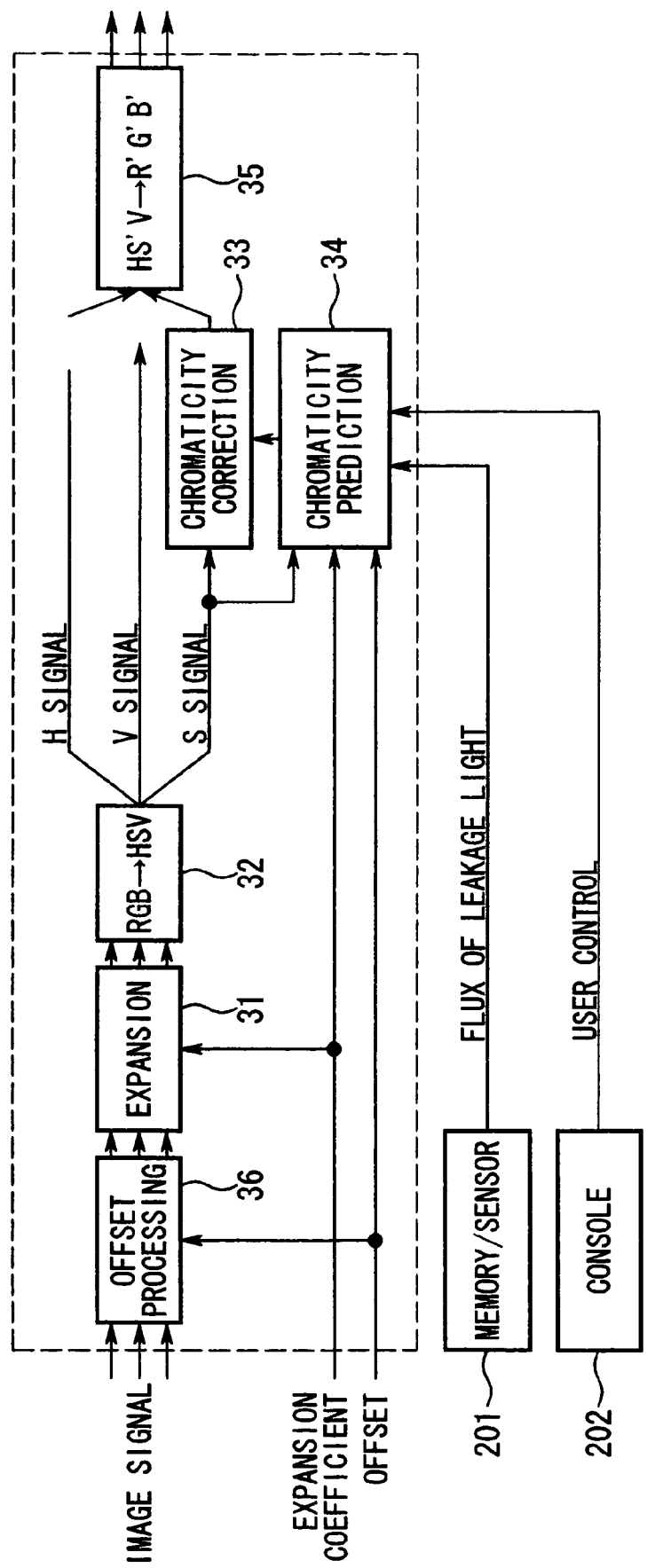
FIG. 9 is a block diagram showing the structure of the image processing section of the second embodiment when image signals are transformed into HSV space.

FIG. 9 is a block diagram showing the structure of the image processing section 21 of the second embodiment when transforming image signals into HSV space. Note that the same numbers are given to component elements that are identical to those of the image processing section of FIG. 3, and a description thereof is omitted.

As is shown in FIG. 9, the image processing section 21 is provided with an offset processing section 36, an expansion section 31, an image signal transformation section 32, a chromaticity correction section 33, a chromaticity prediction section 34, and a color space transformation section 35. In addition, an offset processing section 36 has been added in front of the expansion section 31 shown in FIG. 3.

The offset processing section 36 performs offset processing on image signals, that is, processing to subtract a predetermined subtraction quantity (i.e., offset value) from an image signal based on offset values supplied from the image analysis section 24.

The expansion section 31 performs expansion processing on image signals that have completed offset processing.

The chromaticity prediction section 34 predicts chromaticity of projected image signals based on expansion coefficients supplied from the image analysis section 24, offset values, and quantities of escaped light supplied from the memory/sensor section 201.

A description will now be given of the correction processing of the image processing section 21 of the second embodiment when a transformation has been made into HSV space using specific numerical values. Here, as an example, a description is given of chromaticity correction when the image signals (R, G, B) are (10, 50, 20), the flux of leakage light is 10, and the offset value is 5. It is assumed that gamma valve is 1.0.

Firstly, when normal image signals are transformed into HSV space, they are as is shown in Formula (13) below. Here, the chromaticity prediction section 34 transforms image signals, to which the flux of leakage light of 10 has been added, into HSV space, and predicts the chromaticity. As is shown in Formula (14), here, the chromaticity is predicted to be 170.

(13) Original signal (R, G, B)=(10, 50, 20). At this time (H, S, V)=(135, 204, 50).

(14) After taking flux of leakage light into consideration (R, G, B)=(20, 60, 30). At this time (H, S, V)=(135, 170, 60).

Next, the chromaticity prediction section 34 predicts chromaticity for an image signal when the expansion coefficient is a twofold expansion. The image signal before the expansion can be expressed as is shown in Formula (15) to be the same as in Formula (13) above.

(15) Original signal (R, G, B)=(10, 50, 20). At this time (H, S, V)=(135, 204, 50).

If the offset value of 5 is subtracted from this (R, G, B)=(10, 50, 20), then the result is as shown in Formula (16).

(16) Offset (R, G, B)=(5, 45, 15). At this time (H, S, V)=(135, 227, 45).

If this (R, G, B)=(5, 45, 15) is expanded and given a flux of leakage light of 10 and an optical modulation factor of ½ and gamma valve is 1.0, then

(17) Expansion (R, G, B)=(10, 90, 30). At this time (H, S, V)=(135, 227, 90).

(18) After taking flux of leakage light into consideration (R, G, B)=(20, 100, 40). At this time (H, S, V)=(135, 204, 100).

(19) Optical modulation (×½)

(R, G, B)=(10, 50, 20). At this time (H, S, V)=(135, 204, 50).

As is shown in Formula (19), chromaticity is predicted to be 204.

Next, chromaticity correction by the chromaticity correction section 33 when offset processing has been performed will be described. Chromaticity correction is a method of either lowering color space chromaticity to the chromaticity predicted for when there is no expansion, or raising the color space chromaticity to the chromaticity predicted for when there is an expansion.

Firstly, a description will be given of when correction is performed by making an adjustment to lower the chromaticity to 170.

In the above Formula (17), if S'=170×227/204=189, then the image signals are as shown below.

(H, S', V)=(135, 189, 90). At this time (R, G, B)=(23, 90, 40).

If this (R, G, B)=(23, 90, 40) is given a flux of leakage light of 10 and an optical modulation factor of ½, then (18') After taking flux of leakage light into consideration
(R, G, B)=(33, 100, 50). At this time (H, S, V)=(135, 170, 100)
(19') Optical modulation (×½)
(R, G, B)=(17, 50, 25). At this time (H, S, V)=(135, 170, 50).

As is shown in Formula (19'), adjustment has been made to lower the chromaticity to 170.

Next, a description will be given of when correction is performed by making an adjustment to raise the chromaticity to 204.

In the above Formula (13), if S'=204×204/170=245, then the image signals are as shown in Formula (13').

(13') Original signal
(H, S', V)=(135, 245, 50). At this time (R, G, B)=(2, 50, 14).

If this (R, G, B)=(2, 50, 14) is given a flux of leakage light of 10 and an optical modulation factor of ½, then (14') After taking flux of leakage light into consideration
(R, G, B)=(12, 60, 24). At this time (H, S, V)=(135, 204, 60).

As is shown in Formula (14'), adjustment has been made to raise the chromaticity to 204.

By performing processing such as this, offset processing is performed before image signals are transformed into HSV space so that chromaticity correction is performed while black floating is being suppressed.

Figure 10:
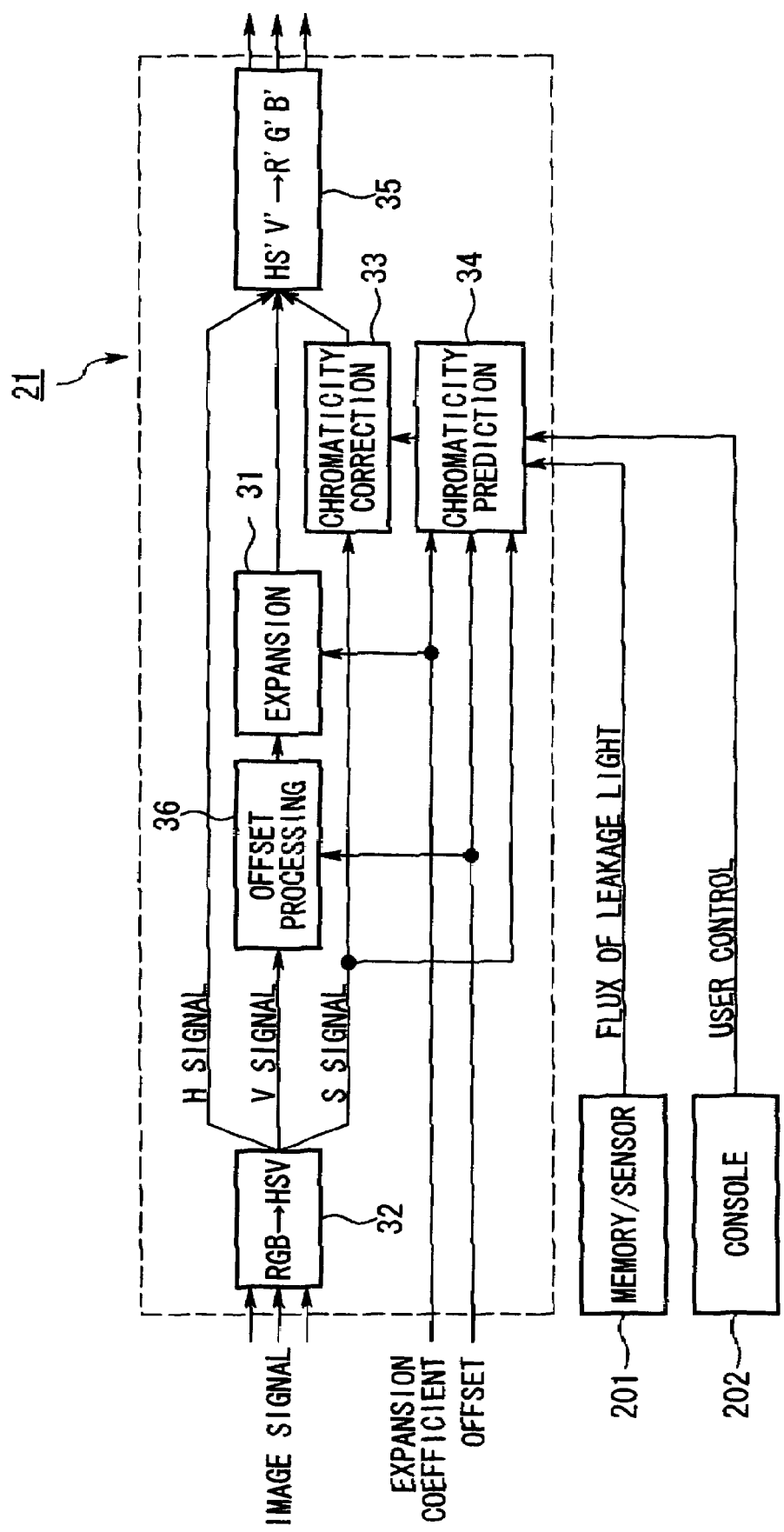
FIG. 10 is a block diagram showing a variant example of the image processing section shown in FIG. 9.

FIG. 10 is a block diagram showing a variant example of the image processing section 21 shown in FIG. 9. Note that the same numbers are given to component elements that are identical to those of FIG. 9, and a description thereof is omitted.

In the image processing section 21 of the variant example of the second embodiment, a structure is employed in which the offset processing by the offset processing section 36 and the expansion processing by the expansion section 31 are only performed on V signals, which indicate brightness value information after transformation by the image signal transformation section 32.

Because offset processing and expansion processing are performed only on V signals, which indicate brightness value information, it is possible to reduce the size of the circuit structure, and further increase the processing speed.

Note that, in the image processing section 21 of FIG. 9 or 10, a structure is employed in which the expansion section 31 is provided after the offset processing section 36, however, the present embodiment is not limited to this. For example, it is also possible to use a structure in which the sequence is the expansion section 31 first and then the offset processing section 36, and to then perform offset processing on V signals, which indicate brightness value information, or RGB image signals after expansion processing.

Figure 11:
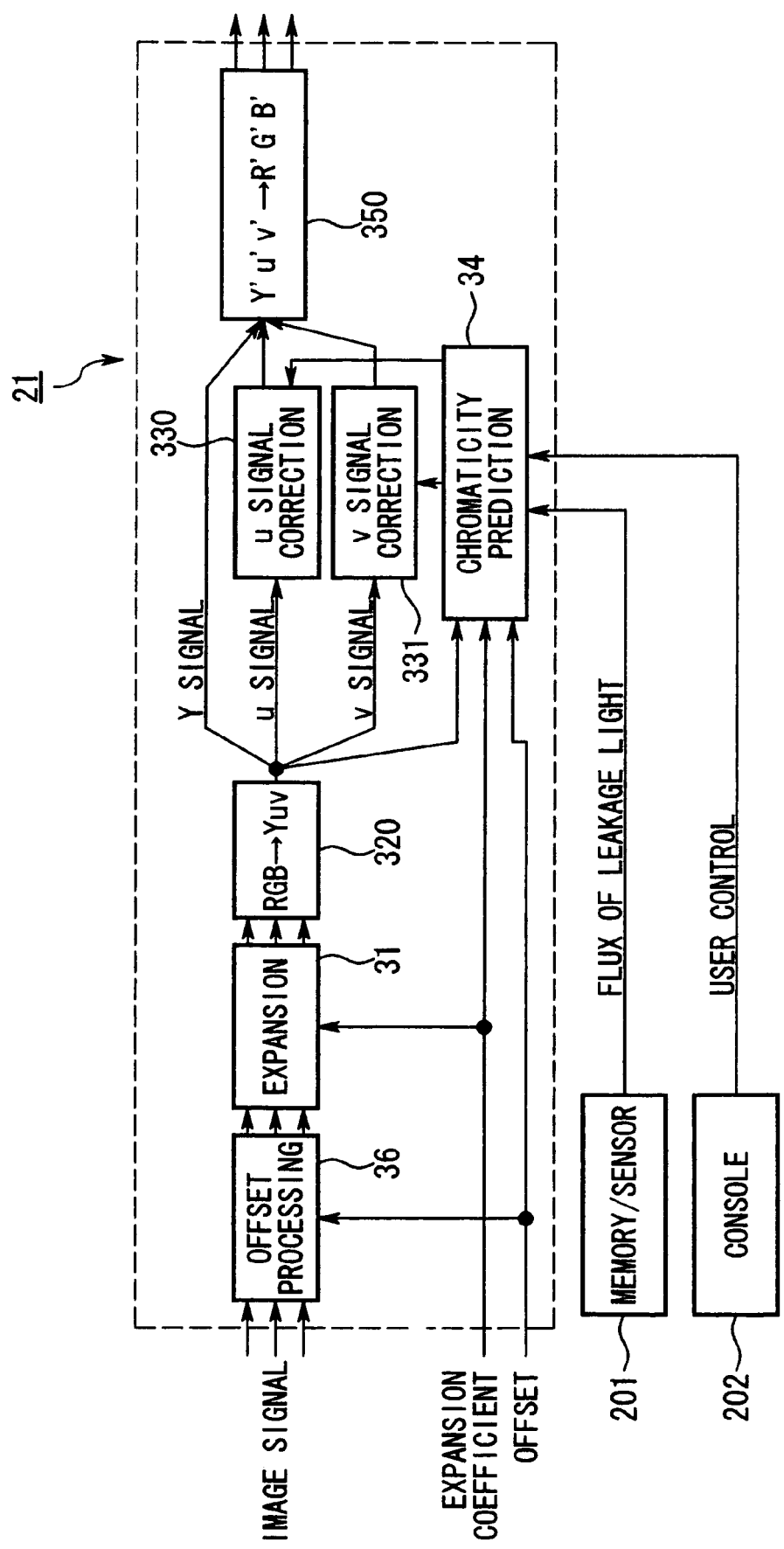
FIG. 11 is a block diagram showing the structure of the image processing section of the second embodiment when image signals are transformed into Yuv space.

FIG. 11 is a block diagram showing the structure of the image processing section 21 of the second embodiment when image signals are transformed into Yuv space. Note that the same numbers are given to component elements that are identical to those appearing in FIGS. 6 and 9, and a description thereof is omitted.

As is shown in FIG. 11, the image processing section 21 is provided with an offset processing section 36, an expansion section 31, an image signal transformation section 320, a u signal correction section 330, a v signal correction section 331, a chromaticity prediction section 34, and a color space transformation section 350. The offset processing section 36 has been added in front of the expansion section 31 shown in FIG. 6.

A description will now be given of the correction processing of the image processing section 21 of the second embodiment when a transformation has been made into Yuv space using specific numerical values. Here, as an example, a description is given of chromaticity correction when the image signals (R, G, B) are (10, 50, 20), the flux of leakage light is 10, and the offset value is 5.

Firstly, when normal image signals are transformed into Yuv space based on Formula group A, they are as is shown in Formula (20) below. Here, if the image signals to which the flux of leakage light of 10 has been added are also transformed into Yuv space based on Formula group A, then they are as is shown in Formula (21).

(20) Original signal
(R, G, B)=(10, 50, 20). At this time (Y, u, v)=(35, −7.2, −22).
(21) After taking flux of leakage light into consideration
(R, G, B)=(20, 60, 30). At this time (Y, u, v)=(45, −7.2, −22).

For Yuv space, as is shown by Formula group A, the chromaticity is expressed by $(u^2+v^2)^{1/2}/Y$. Therefore, the chromaticity prediction section 34 predicts that the chromaticity with the flux of leakage light taken into consideration will be $S_{(21)}$=0.510.

Next, the chromaticity prediction section 34 predicts chromaticity for an image signal when the expansion coefficient is an expansion factor of 2. The image signal before the expansion can be expressed as is shown in Formula (22) to provide the same result as Formula (20) above.

(22) Original signal
(R, G, B)=(10, 50, 20). At this time (Y, u, v)=(35, −7.2, −22).

If the offset value of 5 is subtracted from this (R, G, B)=(10, 50, 20), then the result is as shown in Formula (23).

(23) Offset
(R, G, B)=(5, 45, 15). At this time (Y, u, v)=(29, −7.2, −22).

If this (R, G, B)=(5, 45, 15) is expanded, given a flux of leakage light of 10 and an optical modulation factor of ½, then

(24) Expansion
(R, G, B)=(10, 90, 30). At this time (Y, u, v)=(59, −14, −43).
(25) After taking flux of leakage light into consideration
(R, G, B)=(20, 100, 40). At this time (Y, u, v)=(69, −14, −43).
(26) Optical modulation (×½)
(R, G, B)=(10, 50, 20). At this time (Y, u, v)=(35, −7.2, −22).

As shown above, for Yuv space the chromaticity is expressed by $(u^2+v^2)^{1/2}/Y$. Therefore, the chromaticity prediction section 34 predicts that the chromaticity when there has been a twofold expansion will be $S_{(26)}$=0.658.

A description will now be given of the chromaticity correction performed by the u signal correction section 330 and the v signal correction section 331 when offset processing is performed. Chromaticity correction is a method of either lowering color space chromaticity to the chromaticity predicted for when there is no expansion, or raising the color space chromaticity to the chromaticity predicted for when there is an expansion.

Firstly, a description will be given of when correction is performed by making an adjustment to lower the chromaticity to $S_{(21)}$=0.510.

In the above Formula (24), if u'=−14×35/45=−11 and v'=−43×35/45=−34, then the image signals are as shown below.

(Y, u', v')=(59, −11, −34). At this time (R, G, B)=(21, 83, 36).

If this (R, G, B)=(21, 83, 36) is given a flux of leakage light of 10 and an optical modulation factor of ½, then (25') After taking flux of leakage light into consideration (R, G, B)=(31, 93, 46). At this time (Y, u, v)=(69, −11, −34)

(26') Optical modulation (×½)

(R, G, B)=(16, 47, 23). At this time (Y, u, v)=(35, −5.6, −17).

With u=−5.6 and v=−17, then if the chromaticity is determined using $(u^2+v^2)^{1/2}/Y$, then $S_{(26')}$=0.510. As a result, adjustment has been made to lower the chromaticity to 0.510.

Next, a description will be given of when correction is performed by making an adjustment to raise the chromaticity to $S_{(26)}$=0.658.

In the above Formula (20), if u'=−7×45/35=−9.3 and v'=−22×45/35=−28, then the image signals are as shown below.

(20') Original signal (Y, u', v')=(35, −9.3, −28). At this time (R, G, B)=(3, 54, 16).

(21') After taking flux of leakage light into consideration (R, G, B)=(13, 64, 26). At this time (Y, u, v)=(45, −9.3, −28).

With u=−9.3 and v=−28, then if the chromaticity is determined using $(u^2+v^2)^{1/2}/Y$, then $S_{(21')}$=0.658. As a result, adjustment has been made to raise the chromaticity to 0.658.

By performing processing such as this, offset processing is performed before image signals are transformed into Yuv space so that chromaticity correction can be performed while black floating is being suppressed.

Figure 12:
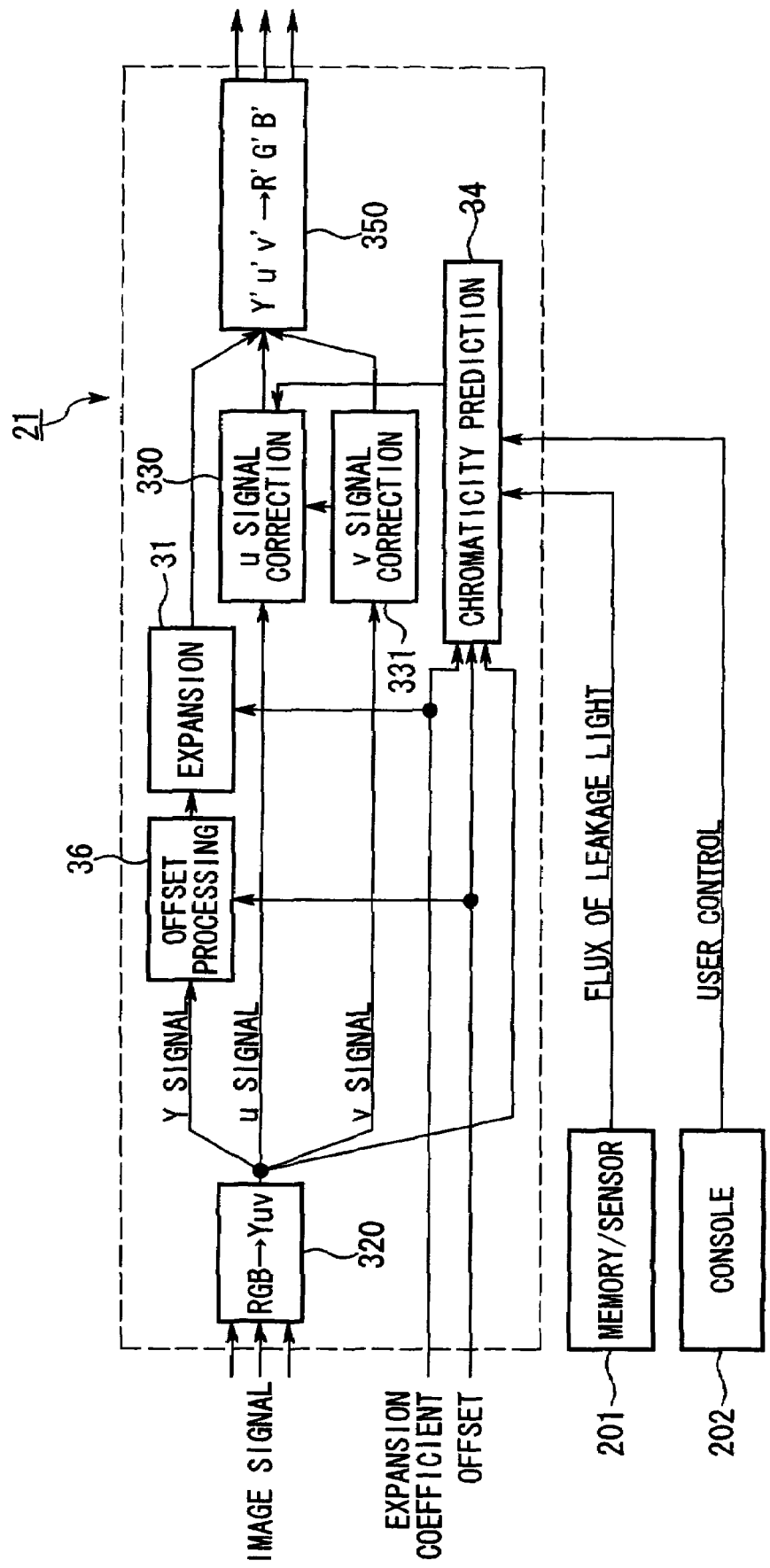
FIG. 12 is a block diagram showing a variant example of the image processing section shown in FIG. 11.

FIG. 12 is a block diagram showing a variant example of the image processing section 21 shown in FIG. 11. Note that the same numbers are given to component elements that are identical to those of FIG. 11, and a description thereof is omitted.

In the image processing section 21 of the variant example of the second embodiment, a structure is employed in which the offset processing by the offset processing section 36 and the expansion processing by the expansion section 31 are only performed on Y signals, which indicate brightness information after transformation by the image signal transformation section 32.

Because offset processing and expansion processing are performed only on Y signals, which indicate brightness information, it is possible to reduce the size of the circuit structure, and further increase the processing speed.

Note that, in the image processing section 21 of FIG. 11 or 12, a structure is employed in which the expansion section 31 is provided after the offset processing section 36, however, the present embodiment is not limited to this. For example, it is also possible to use a structure in which the sequence is the expansion section 31 first and then the offset processing section 36, and to then perform offset processing on Y signals, which indicate brightness value information, or RGB image signals after expansion processing.

Next, a description is given of when the image processing section 21 itself calculates color correction directly based on a predetermined calculation formula.

Figure 13:
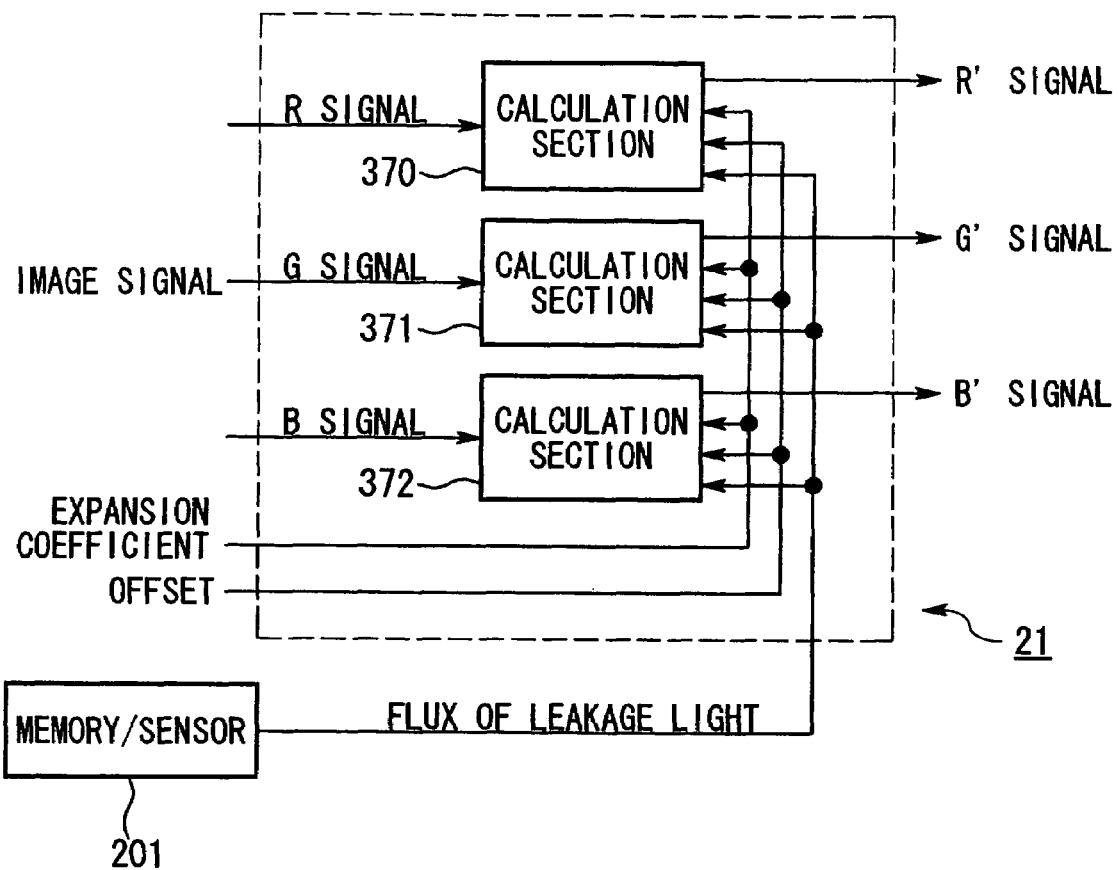
FIG. 13 is a block diagram showing the structure of an image processing section of the third embodiment.

FIG. 13 is a block diagram showing the structure of the image processing section 21 of the third embodiment. The image processing section 21 is provided with calculation sections 370, 371, and 372 that make color corrections of R signals, G signals, and B signals.

The image processing section 21 of the third embodiment makes color corrections of the respective RGB colors by direct calculation using the calculation sections 370, 371, and 372 without performing color space transformation on the image signals such as is described in the first and second embodiments.

Here, the calculation formula employed by the calculation sections 370, 371, and 372 of the image processing section 21 of the third embodiment will be described. As an example, a description is given of when the flux of leakage light is δv and the offset value is $v_0$. The image on the screen are written $(R_0, G_0, B_0)=(r_0+\delta v, g_0+\delta v, b_0+\delta v)$. The displayed image after 1/p optical modulation and expansion by a factor of p can be expressed as is shown below.

$$(R_1, G_1, B_1)=(r_1-v_0+\delta v/p, g_1-v_0+\delta v/p, b_1-v_0+\delta v/p)$$

Here, when a correction calculation is performed to lower the color vividness, the calculation sections 370, 371, and 372 control the signals $r_1'$, $g_1'$, $b_1'$ so as to satisfy the next condition, $$(R_1':G_1':B_1') = (r_1' - v_0 + \delta v/p : g_1' - v_0 + \delta v/p : b_1' - v_0 + \delta v/p)$$
$$= (R_0:G_0:B_0)$$
$$= (r_0 + \delta v : g_0 + \delta v : b_0 + \delta v)$$

When a correction calculation is performed to raise the color vividness, the calculation sections 370, 371, and 372 control the signals $r_0'$, $g_0'$, $b_0'$ in the same way such that $$(R_1':G_1':B_1') = (r_1' - v_0 + \delta v/p : g_1' - v_0 + \delta v/p : b_1' - v_0 + \delta v/p)$$
$$= (R_0':G_0':B_0')$$
$$= (r_0' + \delta v : g_0' + \delta v : b_0' + \delta v)$$

In this way, because the image processing section 21 of the third embodiment performs color correction by direct calculation based on a predetermined calculation formula without transforming RGB image signals into the other color space, the processing speed can be increased by the length of time hitherto consumed by the transformation processing.

The fourth embodiment will now be described. Note that the same numbers are given to component elements that are identical to those of the first and second embodiments, and a description thereof is omitted.

Figure 15:
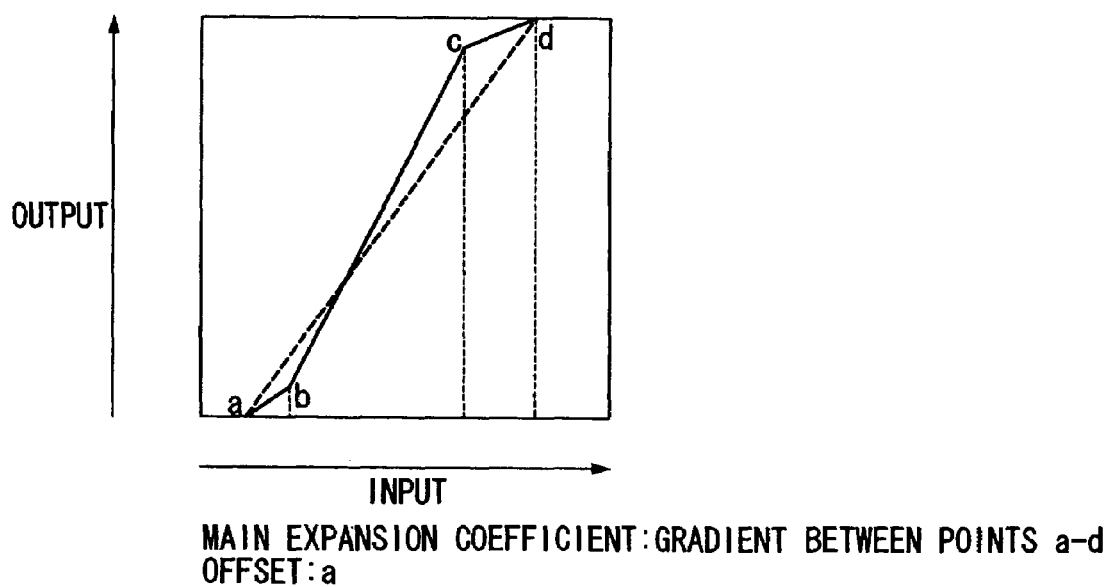
FIG. 15 is a view showing an example of a transformation table.
Figure 14:
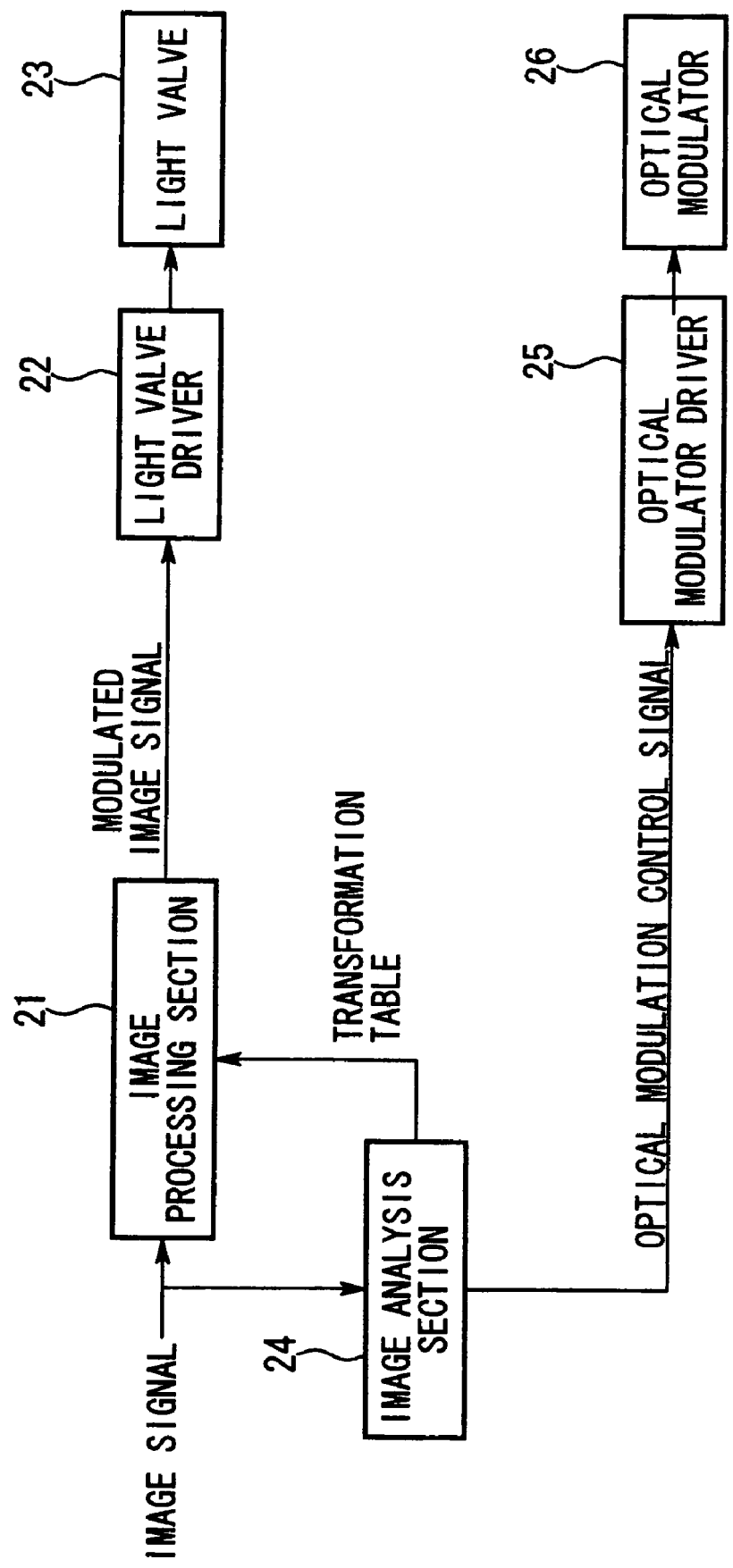
FIG. 14 is a block diagram showing the structure of a drive circuit of the projection type display apparatus of the fourth embodiment.

FIG. 14 is a block diagram showing the structure of a driver of the projection type display apparatus of the fourth embodiment. In the driver of the fourth embodiment expansion coefficients are supplied to the image processing section 21 from the image analysis section 24 in the form of transformation tables. In the fourth embodiment, the image processing section 21 calculates offset values and main expansion coefficients from expansion coefficients provided by a transformation table such as that shown in FIG. 15. The image processing section 21 then predicts color vividness (chromaticity) from the calculated values and the flux of leakage light. Note that the horizontal axis of the transformation table in FIG. 15 represents input image signals, while the vertical axis represents image signals after their transformation.

Figure 16:
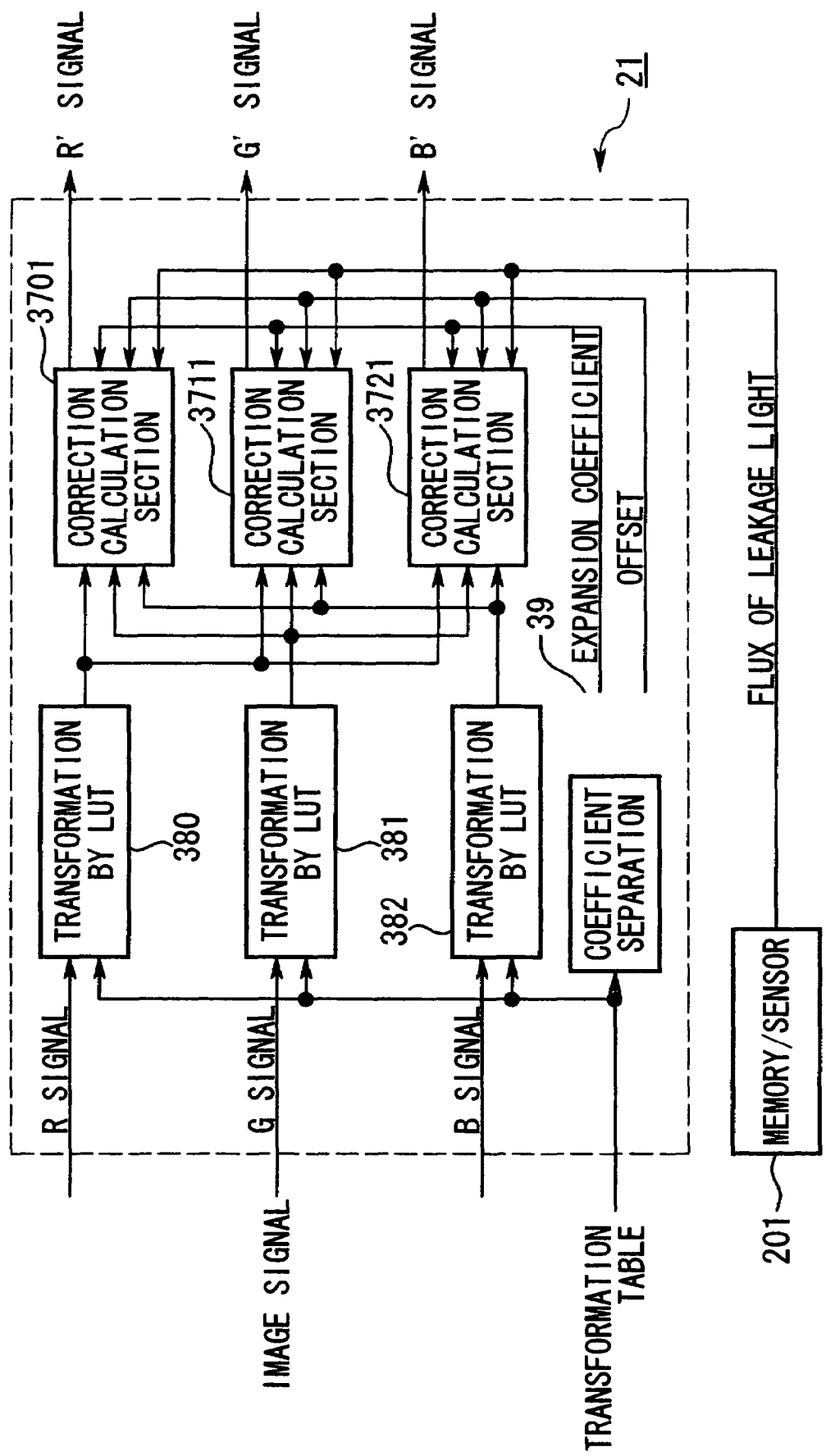
FIG. 16 is a block diagram showing the structure of the image processing section of the fourth embodiment when a transformation table is used.

FIG. 16 is a block diagram showing the structure of the image processing section 21 of the fourth embodiment when a transformation table is used.

As is shown in FIG. 16, the image processing section 21 is provided with transformation processing sections 380, 381, and 382 that perform transformations and expansions based on a transformation table, correction calculation sections 3701, 3711, and 3721, and a coefficient separation section 39.

The transformation processing section 380 performs offset processing and expansion processing on R signals from among the image signals based on a transformation table (a look up table; LUT) supplied from the image analysis section 24. In the same way, the transformation processing section 381 performs offset processing and expansion processing on G signals from among the image signals, and the transformation processing section 382 performs offset processing and expansion processing on B signals.

The coefficient separation section 39 separates expansion coefficients and offset values from a transformation table supplied from the image analysis section 24, and supplies them to the respective correction calculation sections 3701, 3711, and 3721 for RGB signals.

The correction calculation section 3701 performs chromaticity correction of R signals based on offset values and expansion coefficients supplied from the transformation processing section 380, expansion coefficients and offset values supplied from the coefficient separation section 39, and fluxes of leakage light supplied from the memory/sensor section 201. The chromaticity correction by the correction calculation section 3701 is performed based on the predetermined calculation formula described in the third embodiment. In the same way, the correction calculation section 3711 performs chromaticity correction on G signals, and the correction calculation section 3721 performs chromaticity correction on B signals.

Figure 17:
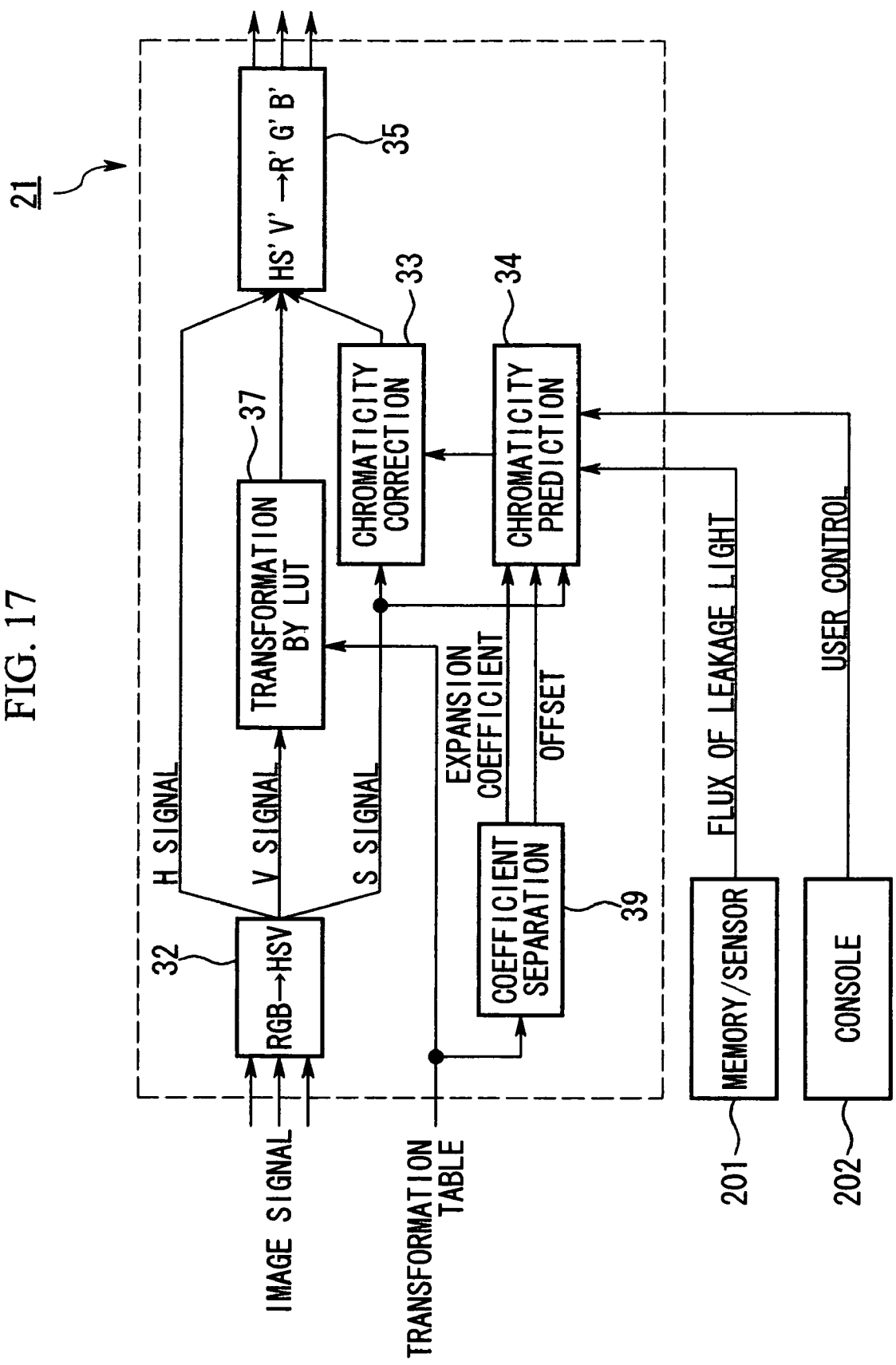
FIG. 17 is a block diagram showing the structure of the image processing section of the fourth embodiment when image signals are transformed into HSV space.

FIG. 17 is a block diagram showing the structure of the image processing section 21 of the fourth embodiment when the RGB signals are transformed into HSV space. Note that the same numbers are given to component elements that are identical to those of the first, second and third embodiments, and a description thereof is omitted.

As is shown in FIG. 17, the image processing section 21 is provided with a transformation processing section 37 that performs expansions and transformations based on transformation tables, an image signal transformation section 32, a chromaticity correction section 33, a chromaticity prediction section 34, a color space transformation section 35, and a coefficient separation section 39.

The transformation processing section 37 performs expansion processing and offset processing on input image signals based on transformation tables supplied from the image analysis section 24.

The image signal transformation section 21 transforms image signals that have undergone expansion processing and offset processing by the transformation processing section 37 into the HSV space form of color space.

The coefficient separation section 39 supplies offset values and expansion coefficients that have been separated from the transformation table supplied from the image analysis section 24 to the chromaticity prediction section 34.

The chromaticity prediction section 34 predicts chromaticity of projected image signals based on expansion coefficients and offset values supplied from the coefficient separation section 39, and on quantities of escaped light supplied from the memory/sensor section 201.

Figure 18:
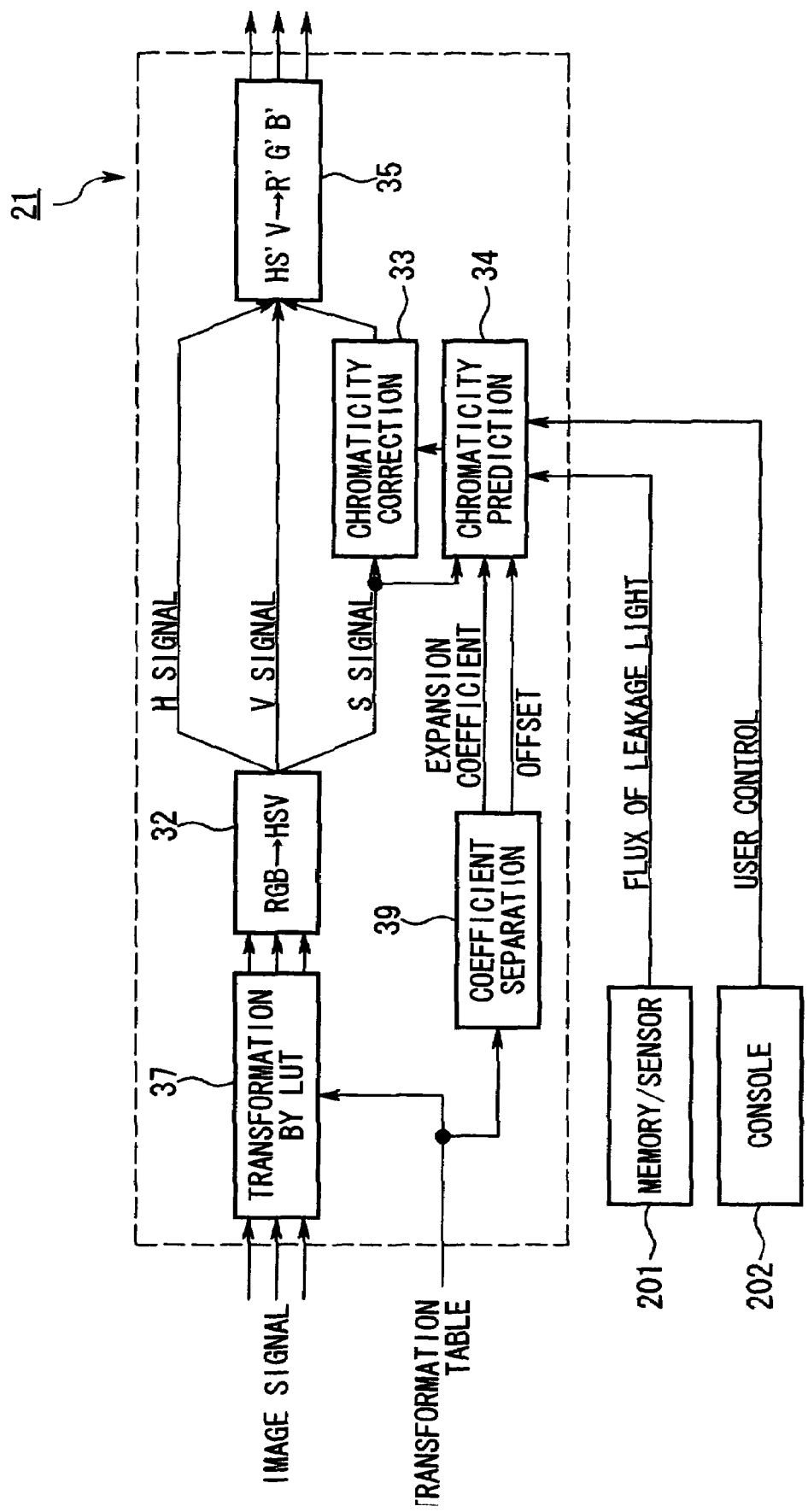
FIG. 18 is a block diagram showing a variant example of the image processing section shown in FIG. 17.

FIG. 18 is a block diagram showing a variant example of the image processing section 21 shown in FIG. 17. Note that the same numbers are given to component elements that are identical to those of FIG. 17, and a description thereof is omitted.

In the image processing section 21 of the variant example of the fourth embodiment, a structure is employed in which the offset processing and expansion processing by the transformation processing section 37 based on transformation tables is only performed on V signals, which represent brightness value information after the transformation by the image signal transformation section 32.

In this way, because offset processing and expansion processing based on transformation tables are only performed on V signals representing brightness value information, the size of the circuit structure can be reduced and the processing speed increased.

In the image processing sections 21 of FIGS. 16 through 18 complicated expansion processing becomes possible and the image representation width can be broadened by using transformation tables.

Figure 19:
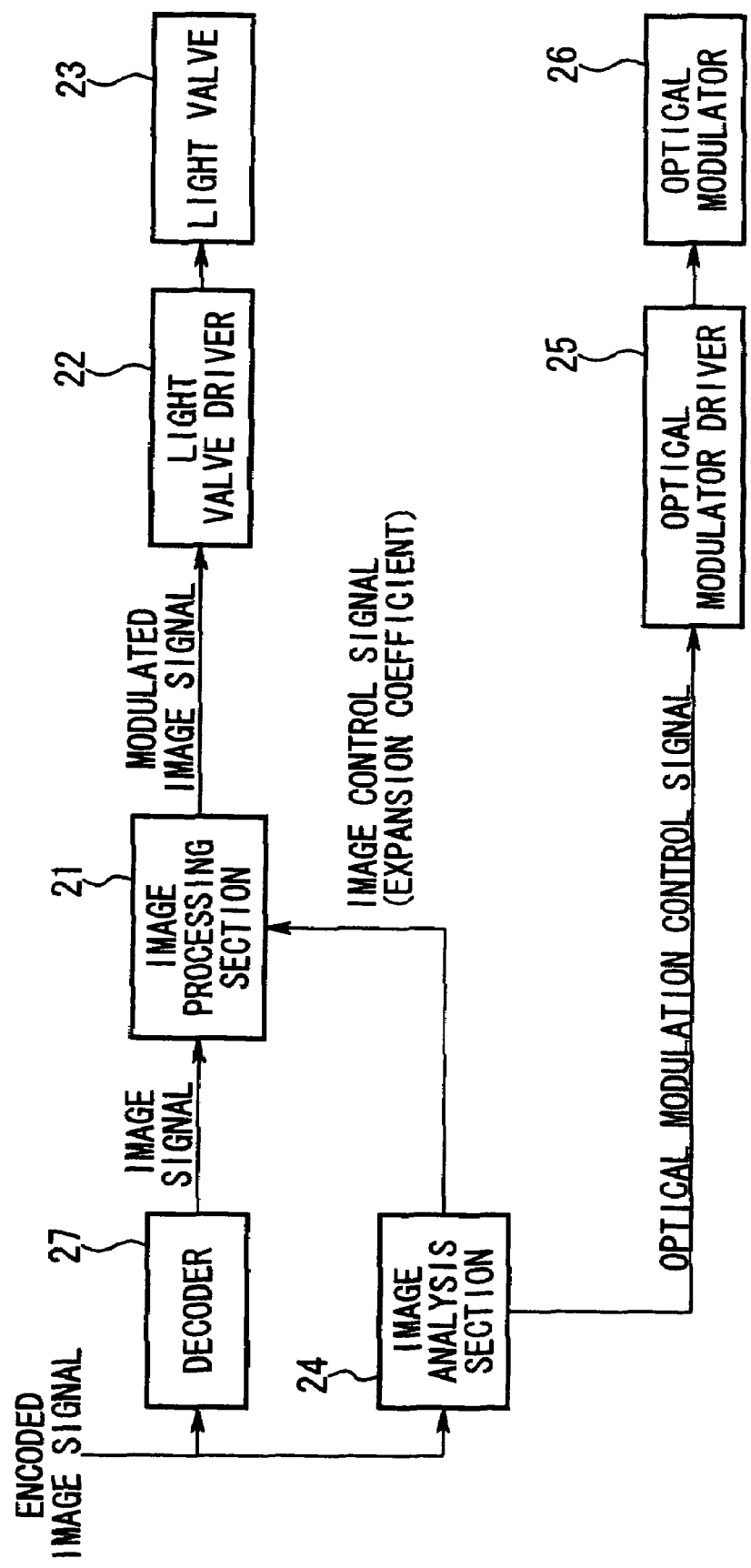
FIG. 19 is a block diagram showing the structure of a drive circuit when encoded image signals are input.

FIG. 19 is a block diagram showing the structure of a drive circuit when encoded image signals are input. Note that the same numbers are given to component elements that are identical to those of the drive circuit shown in FIG. 2, and a description thereof is omitted.

In the drive circuit in FIG. 19, a decoder 27 that decodes encoded image signals has been added to the drive circuit shown in FIG. 2. The decoder decodes encoded signals and supplies decoded image signals to the image processing section 21.

Note that the image processing section 21 of FIG. 19 can be provided with the same structure as those described in the above first through fourth embodiments and in the variant examples of each embodiment.

Figure 20:
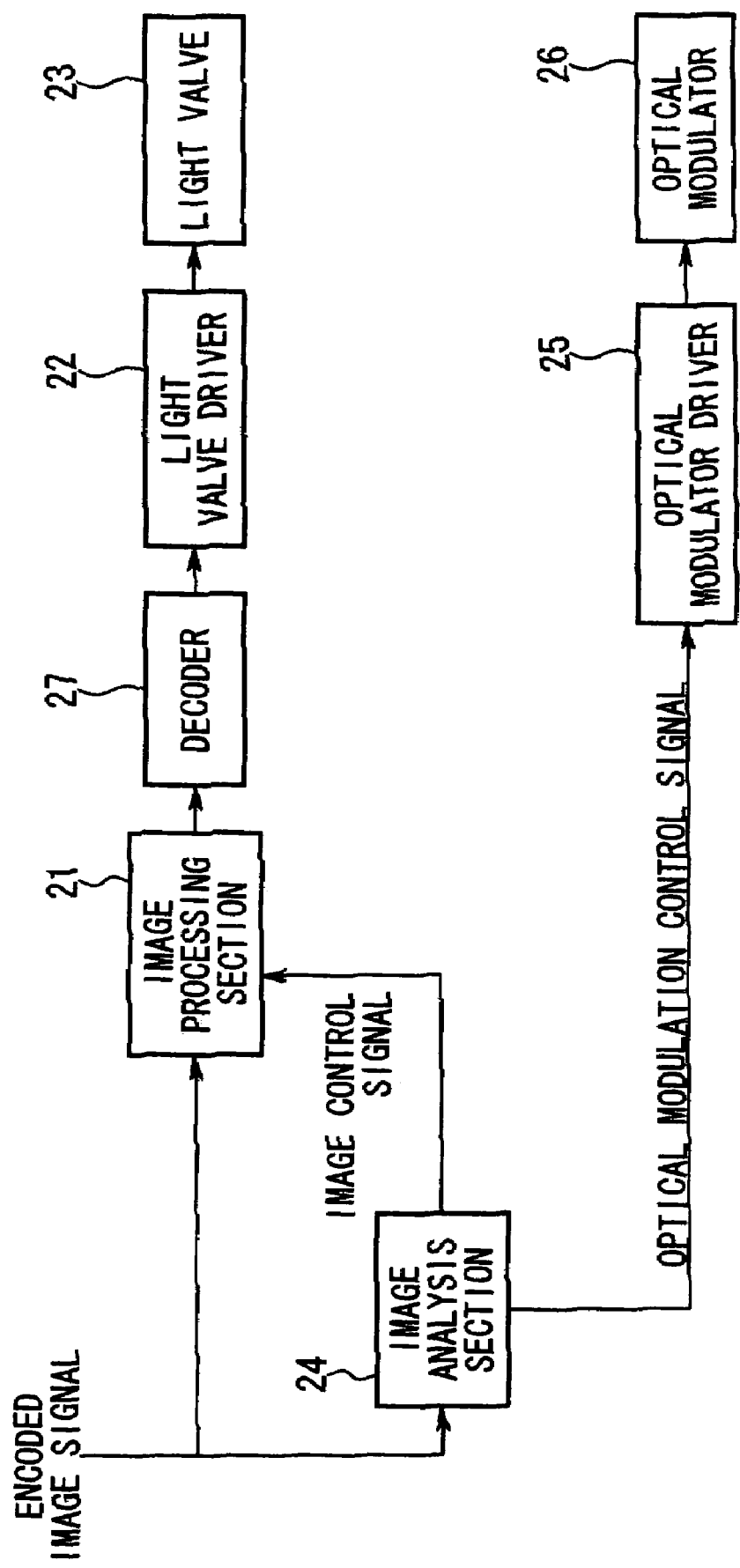
FIG. 20 is a view showing a variant example of the drive circuit shown in FIG. 19.

FIG. 20 is a diagram showing a variant example of the structure shown in FIG. 19. Note that the same numbers are given to component elements that are identical to those of FIG. 19, and a description thereof is omitted.

In the drive circuit shown in FIG. 20, the decoder 27 decodes image signals on which predetermined image processing has been performed by the image processing section 21. That is, encoded image signals are input into the image processing section 21. Note that, in the same way as for FIG. 19, the image processing section 21 of FIG. 20 can be provided with the same structure as those described in the above first through fourth embodiments and in the variant examples of each embodiment.

An embodiment of the present invention has been described above; however, the present invention is not limited to the above described embodiment.

For example, in the selection of correction parameters, the above description is of when a user sets correction parameters using the console section 202, and the selection can be made between lowering or raising a chromaticity, however, the present embodiment is not limited to this. For example, in the console section 202, it is also possible to employ a structure in which a user can optionally make a setting that allows chromaticity to be set in the middle of the values predicted by the chromaticity prediction section 34.

For example, in the present embodiment, a description is given of when a projection type display apparatus is used as an image display apparatus capable of utilizing a computer-readable recording medium storing the image display program and image display method of the present invention, however, the present embodiment is not limited to this, and it is also possible, for example, for a direct view display apparatus to be used.

Furthermore, the computer-readable recording medium storing the image display program and image display method of the present invention may also be used for processing image signals such as those of LCDs, electroluminescence display, plasma displays, digital mirror devices, field emission devices, and the like.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image display apparatus that adjusts a displayed image by changing a flux of light, comprising:
   an image signal transformation device that transforms a brightness level of image signals of a plurality of primary colors of a displayed image into a color space that includes a chromaticity and a lightness;
   a prediction device that predicts a chromaticity of the color space when the flux of light is changed;
   a correction device that corrects the chromaticity in the color space that has been transformed by the image signal transformation device, in accordance with a prediction made by the prediction device;
   an expansion device that expands the lightness in the color space that has been transformed by the image signal transformation device; and
   a color space transformation device that transforms the color space that includes the lightness expanded by the expansion device and the corrected chromaticity into image signals of a plurality of primary colors; and
   an imager that is controlled in accordance with the image signals outputted by the color space transformation device.

2. The image display apparatus according to claim 1, further comprising:
   an optical modulator that is controlled in accordance with the expansion of the lightness by the expansion device.

3. The image display apparatus according to claim 1, further comprising:
   a detecting device that detects a flux of leakage light from the imager.

4. An image display apparatus that adjusts a displayed image by changing a flux of light, comprising:
   a correction device that performs correction of an original chromaticity and expansion of an original brightness level of image signals based on a predetermined calculation formula for each image signal of a plurality of primary colors of a displayed image, in accordance with a prediction of chromaticity of the displayed image when the flux of light is changed; and
   an imager that is controlled in accordance with the image signals outputted by the correction device.

5. The image display apparatus according to claim 4, further comprising:
   an optical modulator that is controlled in accordance with the expansion of the brightness by the correction device.

6. The image display apparatus according to claim 4, further comprising:
   a detecting device that detects a flux of leakage light from the imager.

7. A computer-readable recording medium storing an image display program which adjusts a displayed image displayed by an image display apparatus, by changing a flux of light, the program executable on a computer, the program performing:
   an image signal transformation function that transforms image signals of a plurality of primary colors of a displayed image into a color space that includes a chromaticity and a lightness;
   a chromaticity prediction function that predicts a chromaticity of the color space when the flux of light is changed;
   a correction function that corrects the chromaticity in the color space that has been transformed by the image signal transformation function, in accordance with a prediction made in the chromaticity prediction function;
   an expansion function that expands the lightness in the color space that has been transformed by the image signal transformation function; and
   a color space transformation function that transforms the color space that includes the lightness expanded by the expansion function and the corrected chromaticity into image signals of a plurality of primary colors.

8. A computer-readable recording medium storing an image display program which adjusts a displayed image displayed by an image display apparatus, by changing a flux of light, the program executable on a computer, the program performing:
   a correction function that performs correction of an original chromaticity and expansion of an original brightness level of image signals based on a predetermined calculation formula for respective image signals of a plurality of primary colors of the displayed image, in accordance with a prediction of chromaticity of the displayed image when the flux of light is changed.

* * * * *